US012396435B2

(12) United States Patent
Chitnis

(10) Patent No.: US 12,396,435 B2
(45) Date of Patent: Aug. 26, 2025

(54) PET BED

(71) Applicant: TIMBERDOG, LLC, Mesa, AZ (US)

(72) Inventor: Leena Chitnis, Mesa, AZ (US)

(73) Assignee: TIMBERDOG, LLC, Mesa, AZ (US)

( * ) Notice: Subject to any disclaimer, the term of this patent is extended or adjusted under 35 U.S.C. 154(b) by 0 days.

(21) Appl. No.: 17/554,395

(22) Filed: Dec. 17, 2021

(65) Prior Publication Data

US 2022/0192147 A1 Jun. 23, 2022

Related U.S. Application Data

(60) Provisional application No. 63/127,223, filed on Dec. 18, 2020.

(51) Int. Cl.
*A01K 1/035* (2006.01)
*A01K 1/02* (2006.01)

(52) U.S. Cl.
CPC .......... *A01K 1/0353* (2013.01); *A01K 1/029* (2013.01)

(58) Field of Classification Search
CPC ..... A01K 1/0236; A01K 1/035; A01K 1/0353
See application file for complete search history.

(56) References Cited

U.S. PATENT DOCUMENTS

| 3,633,227 | A * | 1/1972 | Tegeler | A47G 9/086 5/413 R |
| 6,193,034 | B1 * | 2/2001 | Fournier | A45C 7/0095 206/289 |
| 6,637,367 | B1 * | 10/2003 | Dost | A01K 27/006 119/28.5 |
| 7,752,692 | B1 * | 7/2010 | Sanders | A47D 5/006 5/655 |
| 8,127,382 | B1 * | 3/2012 | Plascencia | A47G 9/1045 5/639 |
| 8,256,045 | B2 * | 9/2012 | Cruz | A45C 9/00 5/419 |
| 10,159,327 | B2 * | 12/2018 | Drum-O'Neill | A47G 9/083 |
| 10,925,420 | B2 * | 2/2021 | Noble | A47C 20/021 |

(Continued)

FOREIGN PATENT DOCUMENTS

| CA | 2807692 A1 * | 8/2014 |
| DE | 202017104604 U1 | 10/2017 |

OTHER PUBLICATIONS

Translation of DE 202017104604 U1 (Year: 2013).*

*Primary Examiner* — Peter M Poon
*Assistant Examiner* — Shada Mohamed Alghailani
(74) *Attorney, Agent, or Firm* — Rothwell, Figg, Ernst & Manbeck, P.C.

(57) ABSTRACT

A pet bed which comprises a plurality of layers within a housing, wherein the housing comprises a number of pockets and features designed for pet care and comfort, and is foldable from a sleeping position into a transporting position for ease of transport. The pet bed includes, for instance, an organizer for storing pet supplies and a medical ID card; a cover that can be unrolled over the top surface of the housing to serve as a blanket or sleeping bag and can also be rolled up and received within a pocket to form a support cushion or pillow; a mesh water bottle bag; and adjustable straps for securing the pet bed in the transporting position. The multi-feature pet bed can be used as an all-in-one travel pack to store and transport pet supplies.

18 Claims, 30 Drawing Sheets

(56) References Cited

U.S. PATENT DOCUMENTS

| | | | |
|---|---|---|---|
| 2003/0019434 A1* | 1/2003 | Spires | A01K 7/00 |
| | | | 119/28.5 |
| 2005/0028277 A1* | 2/2005 | Gordon | A47G 9/083 |
| | | | 5/655 |
| 2006/0272581 A1* | 12/2006 | Dunn | A01K 1/0353 |
| | | | 119/28.5 |
| 2006/0288953 A1* | 12/2006 | Bottorff | A01K 13/00 |
| | | | 119/497 |
| 2008/0256705 A1* | 10/2008 | Maguire | A47G 9/086 |
| | | | 5/413 R |
| 2013/0247828 A1* | 9/2013 | Tedaldi | A01K 1/0353 |
| | | | 119/28.5 |
| 2014/0238560 A1* | 8/2014 | Fair | A45C 3/001 |
| | | | 150/106 |
| 2015/0250135 A1* | 9/2015 | Simon | A01K 1/0353 |
| | | | 119/28.5 |
| 2016/0324343 A1* | 11/2016 | Sherwin | B32B 7/12 |
| 2019/0313601 A1* | 10/2019 | Angevine | A01K 1/0353 |
| 2020/0003487 A1* | 1/2020 | Brown | F25D 3/06 |
| 2020/0154669 A1* | 5/2020 | Chen | A01K 1/035 |

* cited by examiner

PET BED

CROSS REFERENCE TO RELATED APPLICATION

The present application claims priority to U.S. Provisional Application No. 63/127,223 filed on Dec. 18, 2020, the disclosure of which is incorporated herein in its entirety by reference.

FIELD OF THE DISCLOSURE

This disclosure relates to a pet bed that comprises multiple features and pockets for pet care and comfort. The pet bed is foldable, or rollable, from a sleeping position and may be secured in a transporting position for ease of transport.

BACKGROUND

Traveling with pets is no easy task. As with young children, pets often require numerous supplies and care items during travel. For instance, a packing list for a pet may typically include a bed, a crate or carrying case, blankets, toys and chew items, medications and supplements, medical ID tags and cards, food/treats, food and water bowls or containers, shampoo and conditioner, towels, waste bags, grooming supplies such as brushes and oral care items, leashes, harnesses, collars, first aid kits, puppy pads or disposable litter boxes, and training tools. Traveling with all of these items usually requires multiple travels bags, taking up significant room in a car or necessitating checked-bag fees on airplanes for the extra luggage.

In addition, conventional pet beds are big and bulky, and are generally designed to stay in one place in your home, such as a living room or bedroom, so that the pet can rest or sleep in close proximity to the family. Many pet beds currently on the market are just large flat cushions that cannot be folded up or easily carried for long distances.

Because traveling with pets is such a challenge, many people opt to leave their pets at home or utilize a pet boarding service, rather than take them along on a trip. However, pets, especially dogs, are very social animals that thrive on routine and human companionship. Dogs left alone at home for an extended time, even with a pet sitter routinely checking in, may suffer from fear or anxiety from being separated from their owners. Pets sent to boarders may also suffer risks to their health from the other boarded pets and catch infections such as kennel cough. And just as pets need human companionship, many individuals also rely on their pets for their health and safety. For instance, some people need to travel with their pets, such as those individuals with disabilities who must constantly be accompanied by a trained service animal.

Thus, there is a need for a pet bed which can be easily folded and packed for transport or carried. Furthermore, there is need for a more convenient travel pack for transporting pet supplies. The present invention provides an all-in-one, pet bed and travel pack that takes up minimal space and can be easily transported for greater ease and convenience for traveling with pets.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In one embodiment, the present disclosure provides a bed, wherein the bed includes a housing comprising a top surface, a bottom surface, and four side surfaces, and a plurality of layers located between the top and bottom surfaces of the housing. The housing includes a first pocket located on the first side surface of the housing, which can be opened and closed to access the plurality of layers. In some embodiments, the first pocket extends around to at least one other side surface of the housing. In some embodiments, the first pocket extends around at least two other side surfaces of the housing, such that the housing is capable of opening up like a suitcase. For instance, in some embodiments, the first pocket extends around three side surfaces of the housing, such that the housing can be unfolded or opened up along a fourth side surface of the housing (like a suitcase or book) to readily access the contents within the housing. In other embodiments, the first pocket extends around all four side surfaces of the housing. The housing further includes a second pocket located on the first side surface of the housing, which can be opened and closed, and a third pocket located on the second side surface of the housing, which can be opened and closed. The bed also includes a cover that is removable from the second pocket, and at least one fastener coupled to the third pocket on the second side surface of the housing. The housing is foldable, or rollable, from a sleeping position to a transporting position. In the sleeping position, the bottom surface of the housing can rest on the ground and the top surface of the housing is accessible for resting thereon. The transporting position comprises the housing folded upon itself such that primarily the bottom surface is exposed, and the at least one fastener can be used to secure the housing in the transporting position.

In some examples, the cover is rollable to produce a rolled configuration and unrollable to produce an unrolled configuration. The rolled configuration allows the cover to be received within the second pocket, therein forming a support cushion under the top surface of the housing. The unrolled configuration allows the cover to extend over at least a portion of the top surface of the housing.

In some examples, the bed further includes a first mechanical connector for detachably securing the cover to an inside surface of the second pocket, and a second mechanical connector for detachably securing the cover to at least a portion of the housing when the cover is in the unrolled configuration.

In some examples, the plurality of layers includes at least one foam layer.

In some examples, at least one of the plurality of layers is an organizer. The organizer comprises a plurality of compartments, and can be slidably removed from and reinserted into the first pocket. In some examples, where the first pocket extends around to at least two other side surfaces of the housing, such that the housing is capable of opening up like a suitcase, the organizer can simply be positioned between the top and bottom surfaces of the housing. In some examples, the organizer includes an extendable handle strap at a distal end thereof, and wherein the extendable handle strap is configured to hang the organizer on different sized objects. In some examples, a length and a width of the organizer is approximately equal to a length and a width of the housing.

In some examples, the at least one fastener comprises at least one adjustable strap member.

In some examples, the bed also includes a carry strap. In some examples, the carry strap comprises a first attachment mechanism at a first distal end and a second attachment mechanism at a second distal end configured to detachably secure the carry strap to the housing. In some examples, the first distal end of the carry strap comprises a closed loop, and the first attachment mechanism is movable along the closed loop. In some examples, the carry strap comprises a reflective material. In some examples, the carry strap is adjustable in length. In some examples, the closed loop on the carry strap is padded.

In some examples, the bed also includes at least one handle portion on at least one of the four side surfaces of the housing, or on at least one corner of the housing where one side surface abuts an adjacent side surface. In some examples, the at least one handle portion comprises a reflective material.

In some examples, the fourth side surface of the housing includes a fourth pocket. In some embodiments, the fourth pocket comprises a lined pouch that can be at least partially removed or pulled outside of the fourth pocket. For instance, in some embodiments, the lined pouch comprises a mesh bag which is coupled to an inside surface of the fourth pocket. In some examples, the mesh bag comprises a cinching mechanism to open and close the mesh bag. In some examples, the cinching mechanism is a drawstring. In other embodiments, the lined pouch may comprise a bag comprising a solid material.

In some examples, the top surface of the housing comprises a first material and the bottom surface of the housing comprises a second material that is different from the first material.

In one embodiment, the present disclosure provides a pet bed including a housing comprising a top surface, a bottom surface, and four side surfaces, and a plurality of layers located between the top and bottom surfaces of the housing. The pet bed also includes a first pocket, which can be opened and closed to access the plurality of layers. In some embodiments, the first pocket extends from a first side surface around to at least one other side surface of the housing. In some embodiments, the first pocket extends from a first side surface to at least two other side surfaces of the housing, such that the housing is capable of opening up like a suitcase. For instance, in some embodiments, the first pocket extends around three side surfaces of the housing, such that the housing can be unfolded or opened up along a fourth side surface of the housing (like a suitcase or book) to readily access the contents within the housing. In other embodiments, the first pocket extends around all four side surfaces of the housing. The plurality of layers includes a first foam layer, a second foam layer, and an organizer between the first and second foam layers. The organizer can be slidably removed from and reinserted into the first pocket. In some embodiments, where the first pocket extends around to at least two other side surfaces of the housing, such that the housing is capable of opening up like a suitcase, the organizer can simply be positioned between the top and bottom surfaces of the housing. The pet bed also includes a second pocket, which can be opened and closed to access a cover. The cover comprises a center portion, a pair of winged portions extending from latitudinal sides of the center portion, and a flange portion extending from one longitudinal side of the center portion. An outer edge of the flange portion is detachably secured to the first side surface of the housing, and an outer edge of each of the pair of winged portions is detachably secured to opposing third and fourth side surfaces of the housing, so as to form vent holes between each of the pair of winged portions and the flange portion. The vent holes allow for air flow between the cover and the top surface of the housing. The vent holes are also adjustable in size to control the temperature between the cover and the top surface of the housing. The housing is foldable, or rollable, from a sleeping position to a transporting position. In the sleeping position, the bottom surface of the housing can rest on the ground and the top surface of the housing is accessible for a pet to rest thereon. The transporting position comprises the housing folded upon itself such that primarily the bottom surface is exposed.

In some examples, the pet bed also includes at least one fastener coupled to the second side surface of the housing. The at least one fastener can be used to secure the housing in the transporting position. In some examples, the at least one fastener is coupled to an inside surface of a third pocket on the second side surface of the housing. In some examples, the at least one fastener comprises at least one adjustable strap member.

In some examples, the top surface of the housing comprises a first material and the bottom surface of the housing comprises a second material that is different from the first material.

In some examples, the organizer is foldable along a plurality of crease portions to produce a stacked configuration and unfoldable to produce an unstacked configuration.

In some examples, the cover is rollable to produce a rolled configuration and unrollable to produce an unrolled configuration. The rolled configuration allows the cover to be received within the second pocket, therein forming a support cushion under the top surface of the housing. The unrolled configuration allows the cover to extend over at least a portion of the top surface of the housing.

In some examples, the pet bed further includes a first mechanical connector for detachably securing the cover to the inside surface of the second pocket, and a second mechanical connector for detachably securing the cover to at least a portion of the housing when the cover is in the unrolled configuration.

In some examples, the distance between the outer edges of the pair of winged portions is greater than the distance between the opposing third and fourth side surfaces of the housing.

In some examples, the first foam layer comprises a memory foam material, and the second foam layer comprises a dense foam material.

In some examples, a length and a width of the organizer is approximately equal to a length and a width of the housing.

In some examples, the cover includes a structural insert at a second longitudinal side of the center portion, opposite the longitudinal side with the flange portion extending therefrom. The structural insert allows the cover to be rolled from the unrolled configuration to the rolled configuration.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1A:
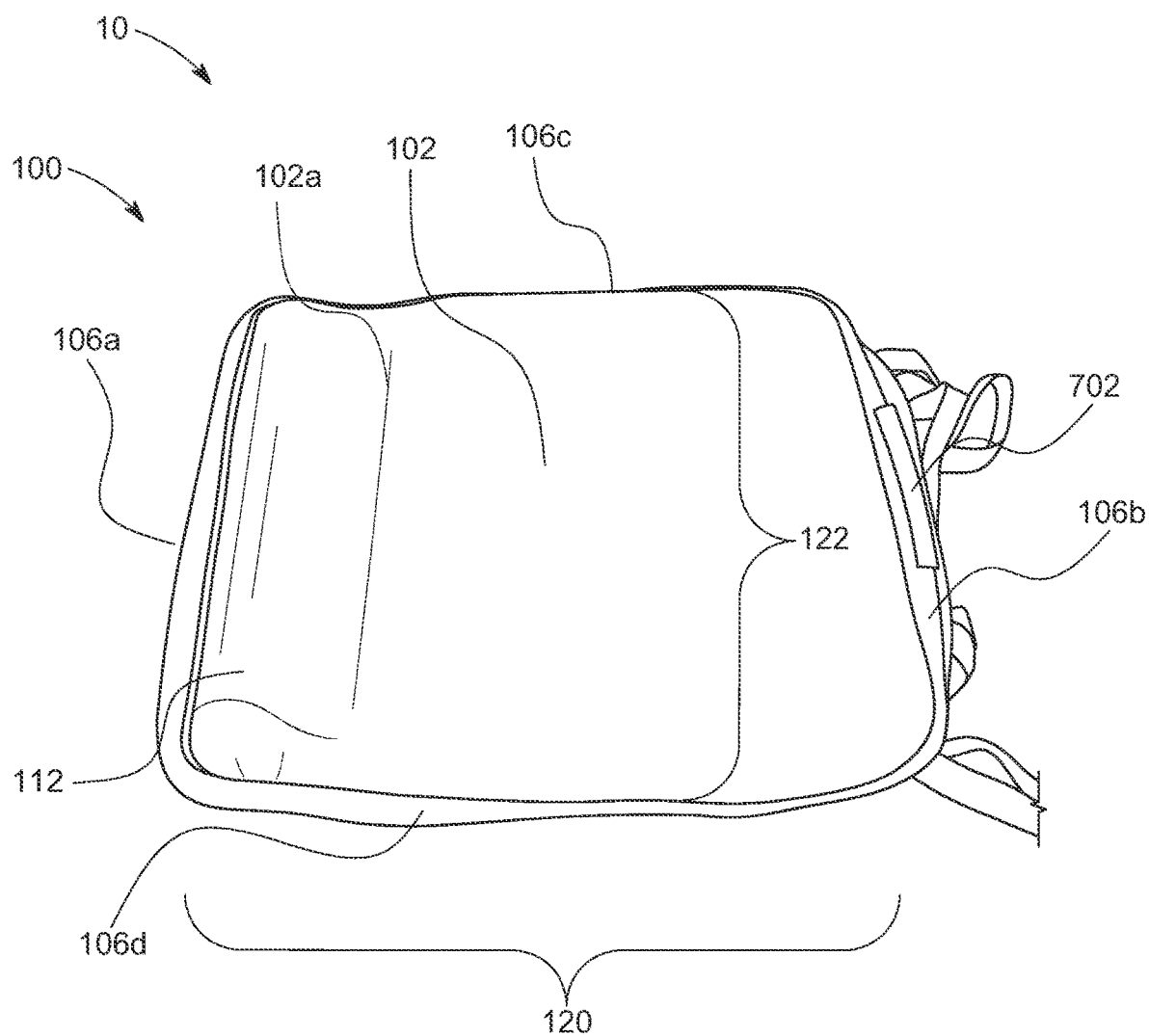
FIG. 1A shows a medial view of an exemplary pet bed, according to an embodiment of the present disclosure, wherein the pet bed housing is in a sleeping position.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

To the extent used herein, the term "adjacent" refers to being near or adjoining. Adjacent objects can be spaced apart from one another or can be in actual or direct contact with one another. In some instances, adjacent objects can be coupled to one another or can be formed integrally with one another.

To the extent used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

To the extent used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

To the extent used herein, the term "mechanical connector" refers to any of: hook-and-loop fasteners, male and female connectors, zippers, lip and tape fasteners, double track fasteners, rivets and eyelets, cufflinks, buttons, snaps, clasps, eyelets and laces, one or more adhesives, safety pins, silicone ridges, tie strings, or drawstrings.

The present disclosure provides a pet bed, which comprises a plurality of layers within a housing, wherein the housing comprises a number of pockets and features designed for pet care and comfort, and is foldable, or rollable, from a sleeping position into a transporting position for ease of transport. In the sleeping position, a soft top surface of the pet bed is accessible for a pet to rest thereon, and the bottom surface may rest on the ground. The bottom surface of the housing may comprise a durable and/or moisture-resistant material so that the pet bed may be used outdoors, such as while camping. The plurality of layers are accessible from a first pocket on the housing, and may comprise an organizer between a plurality of foam layers. The organizer comprises a plurality of compartments for storing pet supplies, such as food (including treats, snacks, and bones), food containers, waste bags, medications, medical ID cards, toys, brushes, leashes, collars, harnesses, and pet clothing. The organizer further comprises an extendible handle strap so that the organizer may be hung on different sized objects, such as a tree, a pole, a car roof rack, a hook in a closet, a clothing rack, a towel rack, or a tent to easily access the pet supplies stored therein.

The housing may further comprise a second pocket for receiving a cover, wherein the cover is detachable from an inside surface of the second pocket. The cover is rollable to produce a rolled configuration and unrollable to produce an unrolled configuration. The unrolled configuration allows the cover to extend over at least a portion of the top surface of the housing, so as to serve as a blanket, sheet, or sleeping bag to provide warmth and comfort to a pet resting thereon. The cover may also be used to calm a pet suffering from anxiety, fear, or over-excitement, or to protect a pet from inclement weather such as wind, hail, snow, or rain. The cover may also be used for burrowing for smaller pets. Vent holes formed between the cover and the top surface of the housing are adjustable in size to control the temperature. The rolled configuration allows the cover to be received within the second pocket, therein forming a support cushion under the top surface of the housing. This feature provides a soft bolster or a pillow for a pet to rest its head thereon, when the housing is in the sleeping position.

The housing may further comprise at least one fastener secured to an inside surface of a third pocket. The at least one fastener may be used to secure the housing in the transporting position once folded from the sleeping position. A carry strap may be attached to the housing in the transporting position. This feature is particularly advantageous for users who are traveling with pets, and need to carry the pet bed for some distances, such as through an airport or while hiking or camping with a pet. The carry strap may also be used as a leash, as it includes a closed loop (which may be padded) at one end to serve as a handle, and attachment mechanisms, such as carabiners, to connect to a dog's collar or harness. The housing may further comprise a bag, such as a mesh bag, coupled to an inside surface of a fourth pocket to hold additional items, such as a water bottle; and handle portions that may be used to hang the pet bed for storing or drying, wherein the handle portions comprise reflective surfaces to easily find the pet bed in the dark. The housing is also machine washable for easy and convenient cleaning.

The present disclosure ultimately provides a multi-feature pet bed, which can be used as an all-in-one travel pack to store and transport pet supplies. The pet bed provides an alternative to large, bulky, unfoldable, or hard-to-carry pet beds, and eliminates the need to pack extra bags while traveling with a pet. Because the foldable configuration allows a user to quickly fold up the pet bed for easy transporting and storage, users may be better equipped to travel with pets. This ultimately allows more pet owners to bring their companions along, rather than paying the expensive costs or risking their pet's health with boarding, and provides greater ease of transportation for those traveling with service animals.

While the subject matter of this disclosure has been described with regard to pets, the bed of the present disclosure is not limited to a pet bed. For instance, the present disclosure provides a bed that may be used by any mammal, including humans. Accordingly, the scope of this disclosure includes a bed that may used by both adults and infants. The bed is also not limited in size or dimensions and may be of any size or dimension to accommodate the appropriate mammal. In a preferred embodiment, the bed is a pet bed.

FIG. 1A shows a medial view of an exemplary pet bed 10, according to an embodiment of the present disclosure. The pet bed 10 comprises a housing 100, wherein the housing 100 includes a top surface 102, a bottom surface 104, and four side surfaces 106a-106d. The housing 100 may have a length 120 and a width 122. The top surface 102 of the housing 100 comprises a first material and the bottom surface 104 of the housing 100 comprises a second material. In some embodiments, the first material is the same as the second material. In a preferred embodiment, the first material is different than the second material. The top surface 102 of the housing 100 may comprise a soft material configured to accommodate and provide comfort to a pet resting thereon. For instance, the top surface 102 of the housing 100 may comprise a material including, but not limited to, any of: cotton (including space cotton), polyester, fleece, microfiber, suede, faux suede, faux fur, wool, cashmere wool, flannel, leather, denim, linen, velvet, chiffon, satin, silk, twill, muslin, nylon, rayon, corduroy, felt, terrycloth, yarn, or canvas. In a preferred embodiment, the top surface 102 comprises a material including at least one of cotton (including space cotton), fleece, polyester, and microfiber. In a more preferred embodiment, the top surface 102 comprises fleece.

Figure 1B:
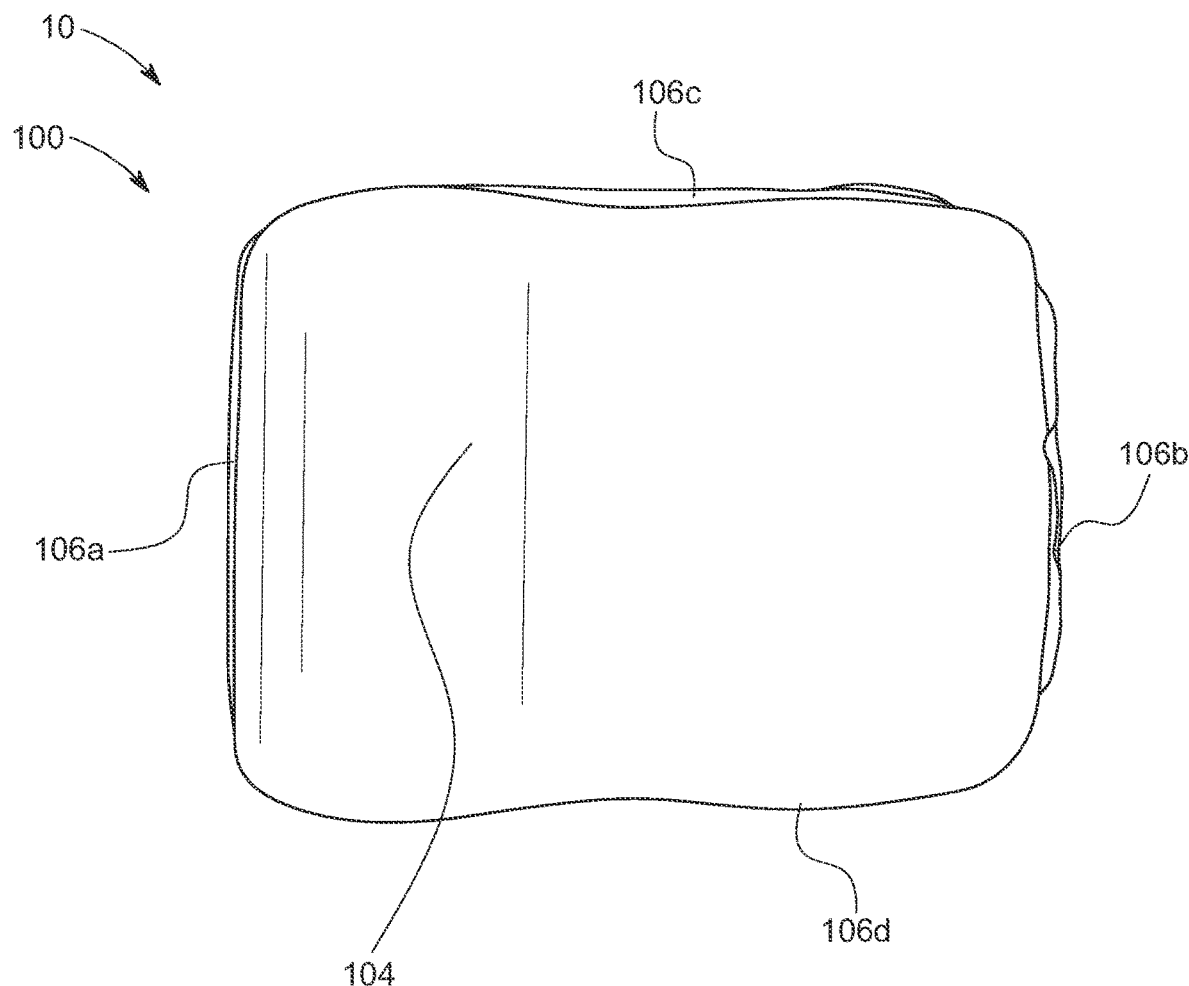
FIG. 1B shows a lateral view of an exemplary pet bed, according to an embodiment of the present disclosure.
Figure 1C:
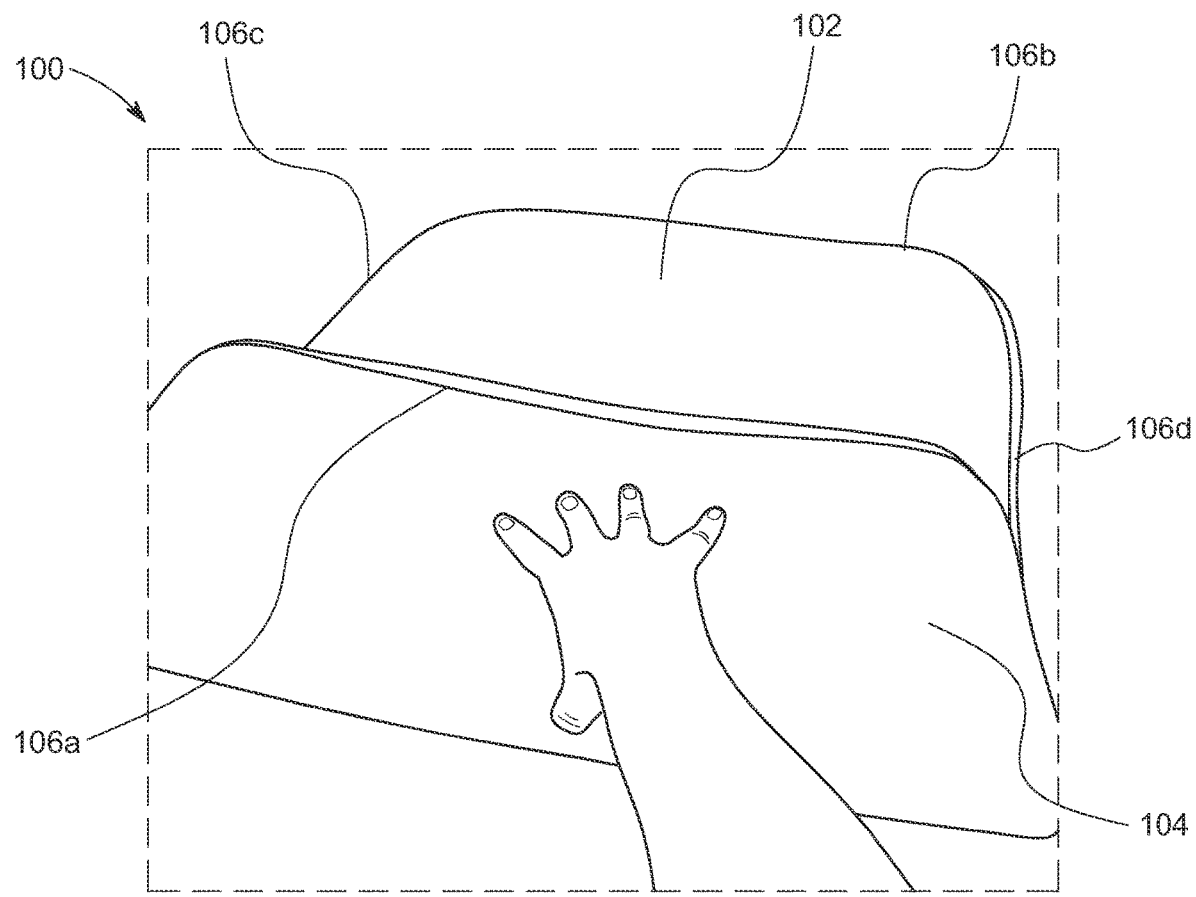
FIGS. 1C-1E show exemplary configurations wherein the pet bed of FIGS. 1A-1B is folded, or rolled, from the sleeping position into a transporting position, according to an embodiment of the present disclosure.
Figure 1D:
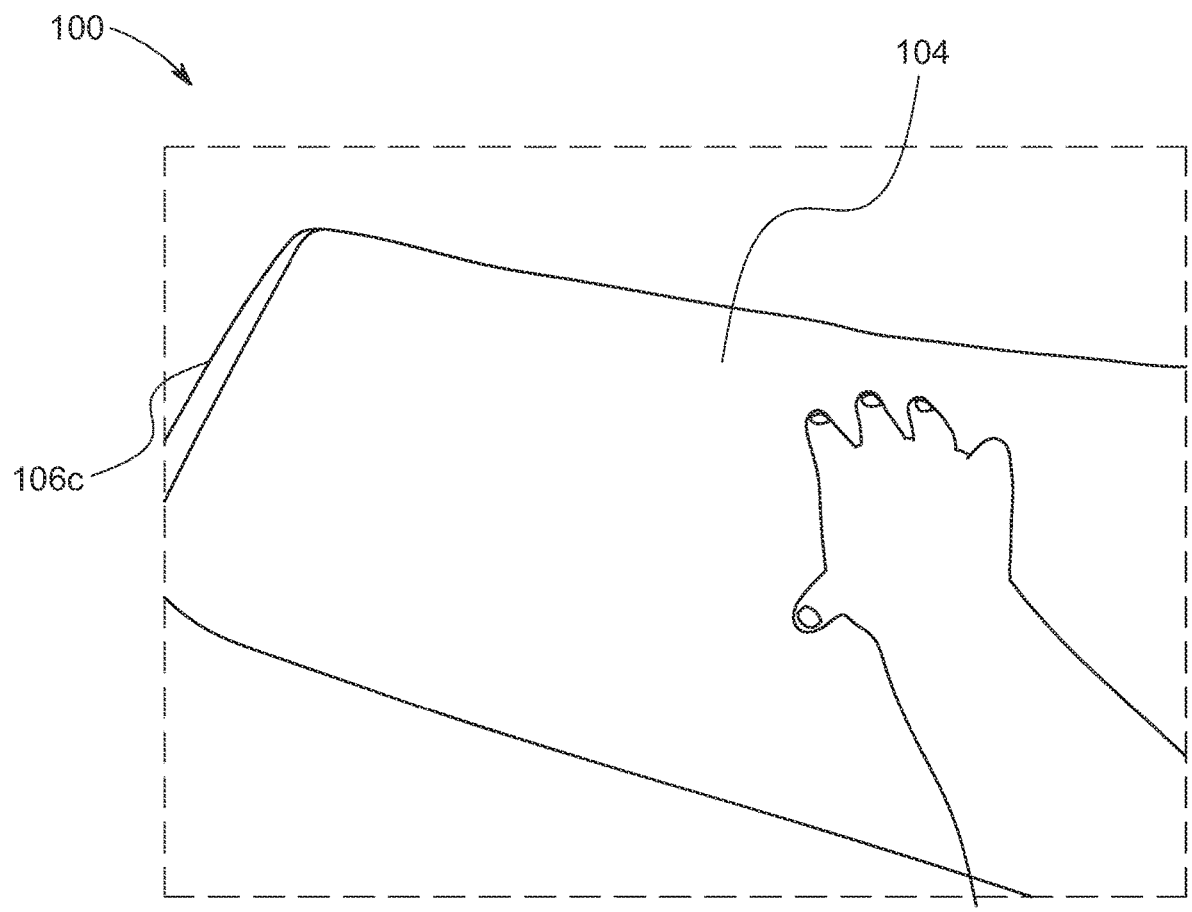

FIG. 1B shows a lateral view of an exemplary pet bed 10, according to an embodiment of the present disclosure, showing the bottom surface 104 of the housing 100. The bottom surface 104 of the housing is made from durable and/or moisture-wicking material, configured to allow the bottom surface 104 of the housing 100 to rest around the ground, including outdoor terrain, while preventing dampness or moisture from being absorbed by the housing 100. Exemplary materials of the bottom surface 104 include, but are not limited to, any of: nylon, rip-stop, polyurethane laminate, latex, natural rubber, thermoplastic polyurethane, laminated fabrics (such as laminated cotton and poplin), oilcloth, polyester fleece, fabrics with a waterproof or water resistant coating/laminate, wool, vinyl, pleather, plastic, densely woven branded fabrics (such as Ventile), and synthetic waterproof or water resistant fabrics (such as Gore-Tex). In some instances, the waterproof or water resisting coating/laminate comprises a waterproofing material such as rubber, polyvinyl chloride, polyurethane, silicone elastomer, fluoropolymers, and/or wax.

The four side surfaces 106a-106d of the housing 100 may comprise any of the materials discussed above with regard to the top surface 102 and bottom surface 104 of the housing. In a preferred embodiment, the four side surfaces 106a-106d of the housing 100 comprise a durable and/or moisture-wicking material, such as those discussed above with regard to the bottom surface 104 of the housing. In a more preferred embodiment, the four side surfaces 106a-106d comprise the same material as that of the bottom surface 104 of the housing 100.

The housing 100 is foldable, or rollable, from a sleeping position to a transporting position. In the sleeping position, the bottom surface 104 of the housing 100 can rest on the ground and the top surface 102 of the housing 100 is accessible for resting thereon. The transporting position comprising the housing 100 folded upon itself such that primarily the bottom surface 104 is exposed. FIG. 1A shows the housing 100 in the sleeping position, according to an embodiment of the present invention. As shown in FIGS. 1A-1E, the housing 100 may be folded, rolled, or otherwise collapsed or bent onto itself, from the sleeping position (as shown in FIG. 1A) into the transporting position (as showing in FIG. 1E), such that the top surface 102 of the housing 100 is enveloped or enclosed within the housing 100.

Figure 1E:
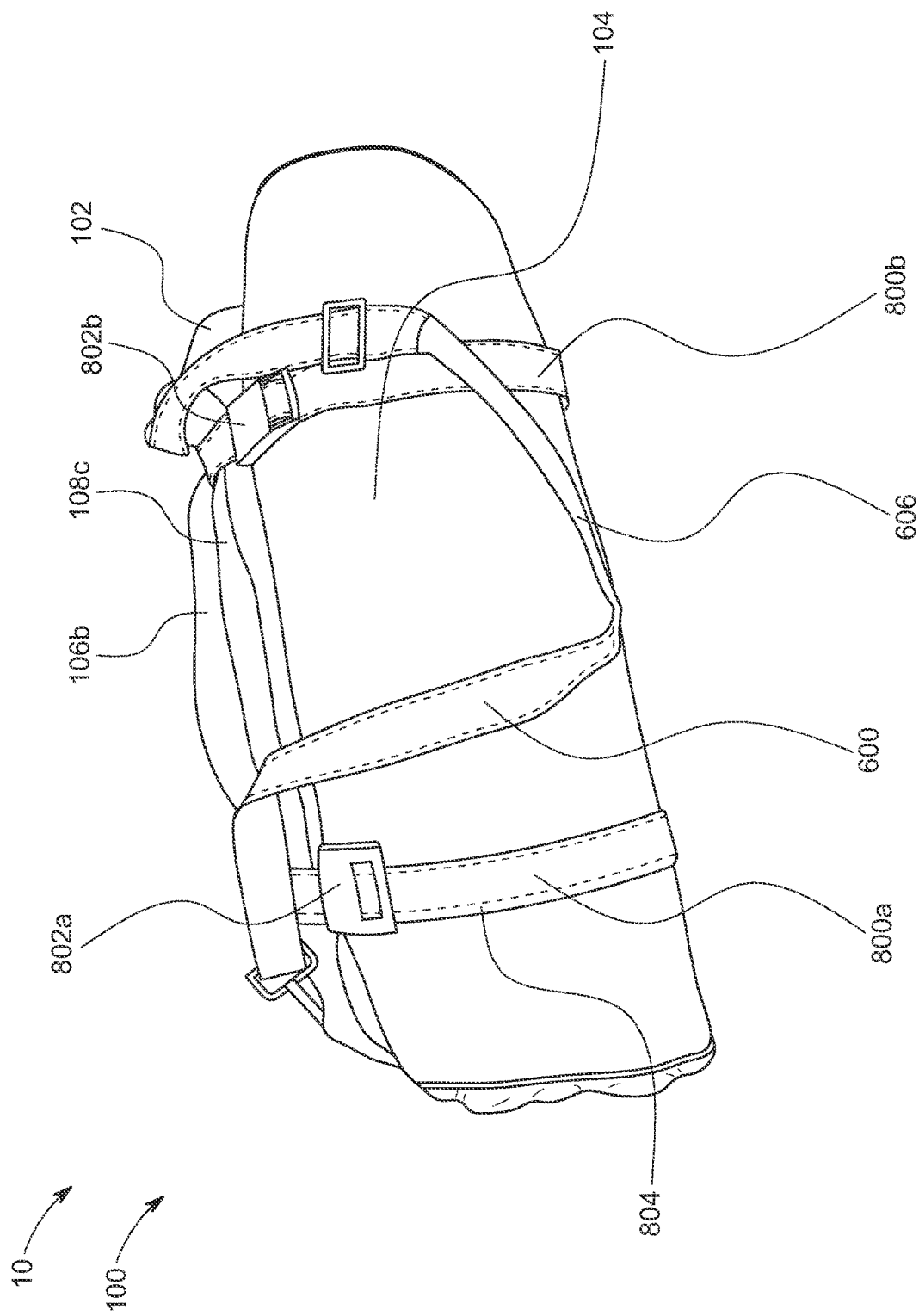

The housing 100 may further comprise at least one fastener 800. As shown in FIG. 1E, the housing 100 may be secured in the transporting position by the at least one fastener 800. The at least one fastener 800 may comprise at least one of: an adjustable strap member, a non-adjustable strap member, a tie string, a drawstring, a hook-and-loop fastener, male and female connectors, zippers, lip and tape fasteners, double track fasteners, rivets and eyelets, cufflinks, buttons, snaps, clasps, eyelets and laces, or safety pins. In a preferred embodiment, the at least one fastener 800 comprises first and second adjustable strap members 800a, 800b, wherein the first and second adjustable strap members 800a, 800b are wrapped around the housing 100 in the transporting position, adjacent to the bottom surface 104 of the housing 100. The first and second adjustable strap members 800a, 800b are adjustable so as to accommodate any configuration of the housing 100 in the transporting position, no matter how tightly or loosely the housing 100 has been rolled or folded. In some embodiments, the first and second adjustable strap members 800a, 800b further comprise male and female connectors 802a, 802b for securing the first and second adjustable strap members 800a, 800b in place. In some embodiments, the male and female connectors 802a, 802b are buckles. In some embodiments, the first and second adjustable strap members 800a, 800b may further comprise a stitching 804 that is a different color than the strap members. In some embodiments, the stitching 804 may comprise a reflective material, configured to allow for better visibility of the pet bed 10.

Figure 2:
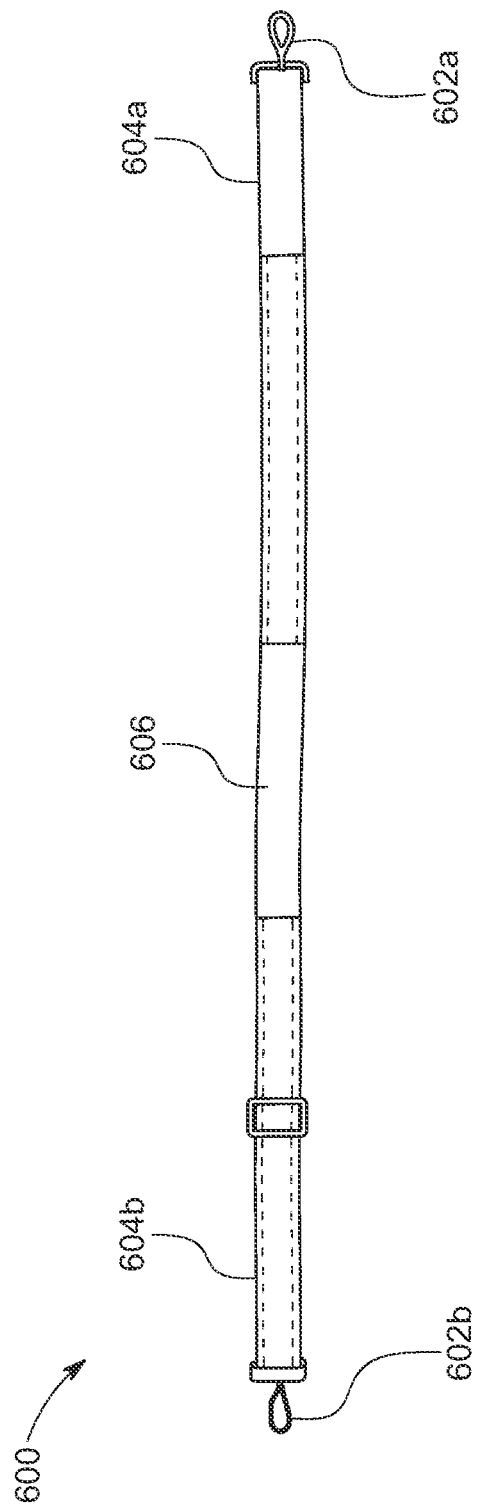
FIG. 2 shows a top view of an exemplary carry strap, according to an embodiment of the present disclosure.

Pet bed 10 may further comprise a carry strap 600 to allow a user to carry the pet bed 10 by hand or on an arm or over the shoulder, or to hang up the pet bed 10 for storage, access to the pet supplies (not shown) stored within the pet bed 10, or cleaning and drying of the pet bed 10. As shown in FIG. 2, in some embodiments, the carry strap 600 may comprise a first attachment mechanism 602a at a first distal end 604a and a second attachment mechanism 602b at a second distal end 604b configured to detachably secure the carry strap 600 to the housing 100 (as shown in FIG. 1E). The carry strap 600 may further comprise a padded portion 606 for added comfort to the user when the carry strap 600 is positioned against the user's body when carrying the pet bed 10. In some embodiments, the first distal end 604a of the carry strap 600 comprises a closed loop, wherein the first attachment mechanism 602 is movable along the closed loop. This feature is particularly advantageous as it converts the carry strap 600 into a pet leash. For instance, the first attachment mechanism 602a may be moved inward, away from the first distal end 604a and towards the second distal end 604b along the closed loop, allowing a user to insert their hand or wrist through the closed loop as the handle portion of the leash. In some embodiments, the closed loop comprises a padded material for added comfort when used as the handle portion of the leash (for instance, when held in the user's hand or when worn around the user's wrist). The second attachment mechanism 602b may then be attached to a pet's collar, harness, or other piece of clothing. Because the carry strap 600 may also be used as a leash, this may eliminate the need to pack a separate leash (which may be bigger or bulkier) or may provide an additional or back-up leash if the pet's primary leash is misplaced, lost, damaged, or otherwise unavailable for use. In some embodiments, the carry strap 600 may further comprise a reflective material. In some embodiments, the carry strap 600 is adjustable.

The pet bed 10 may further comprise a plurality of layers 200a, 200b, 300 located between the top 102 and bottom surfaces 104 of the housing 100. In some embodiments, the first side surface 106a of the housing 100 may comprise a first comprise a first pocket 108a which can be opened and closed to access the plurality of layers 200a, 200b, 300. In some embodiments, the first pocket 108a extends around to at least one other side surface of the housing 100. In some embodiments, the first pocket 108a extends around to at least two other side surfaces of the housing 100, such that the housing 100 is capable of opening up like a suitcase (not shown). For instance, in some embodiments, the first pocket 108a extends around three side surfaces of the housing 100, such that the housing 100 can be unfolded or opened up along a fourth side surface of the housing 100 (like a suitcase or book) to readily access the contents within the housing 100. In other embodiments, the first pocket 108a extends around all four side surfaces of the housing 100. The first pocket 108a may be opened and closed by a first pocket mechanical connector 130. In a preferred embodiment, the first pocket mechanical connector 130 is a zipper. In some embodiments, the first pocket mechanical connector 130 is covered with a first hood 140. The first hood 140 may comprise a section of fabric extending over the first pocket mechanical connector 130. In some embodiments, the first hood 140 comprises a durable and/or moisture-wicking material such as those discussed above with regard to the bottom surface 104 of the housing 100. The first hood 140 is configured to protect the first pocket mechanical connector 130 from damage, the elements (e.g., to prevent rust), and to prevent a pet from chewing on, choking on, and/or consuming the first pocket mechanical connector 130. In some examples, the first hood 140 may be a different color than the rest of the housing 100 to indicate the location of the first pocket mechanical connector 130 and/or the first pocket 108a, and adds an attractive trim and outline to the pet bed.

Figure 3A:
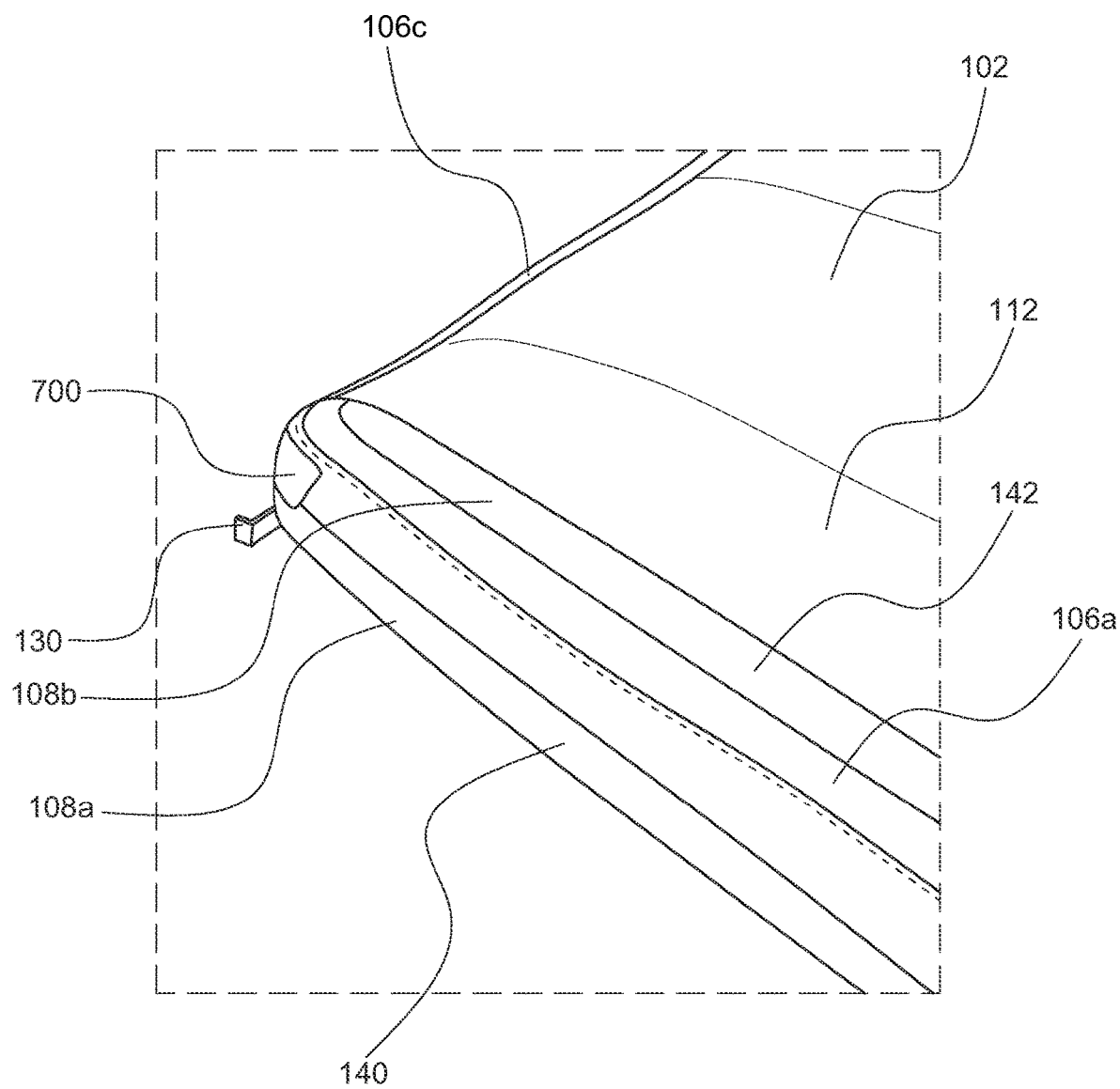
FIGS. 3A-3C show exemplary configurations of a first pocket on a first side surface of the pet bed housing, according to an embodiment of the present disclosure.
Figure 3B:
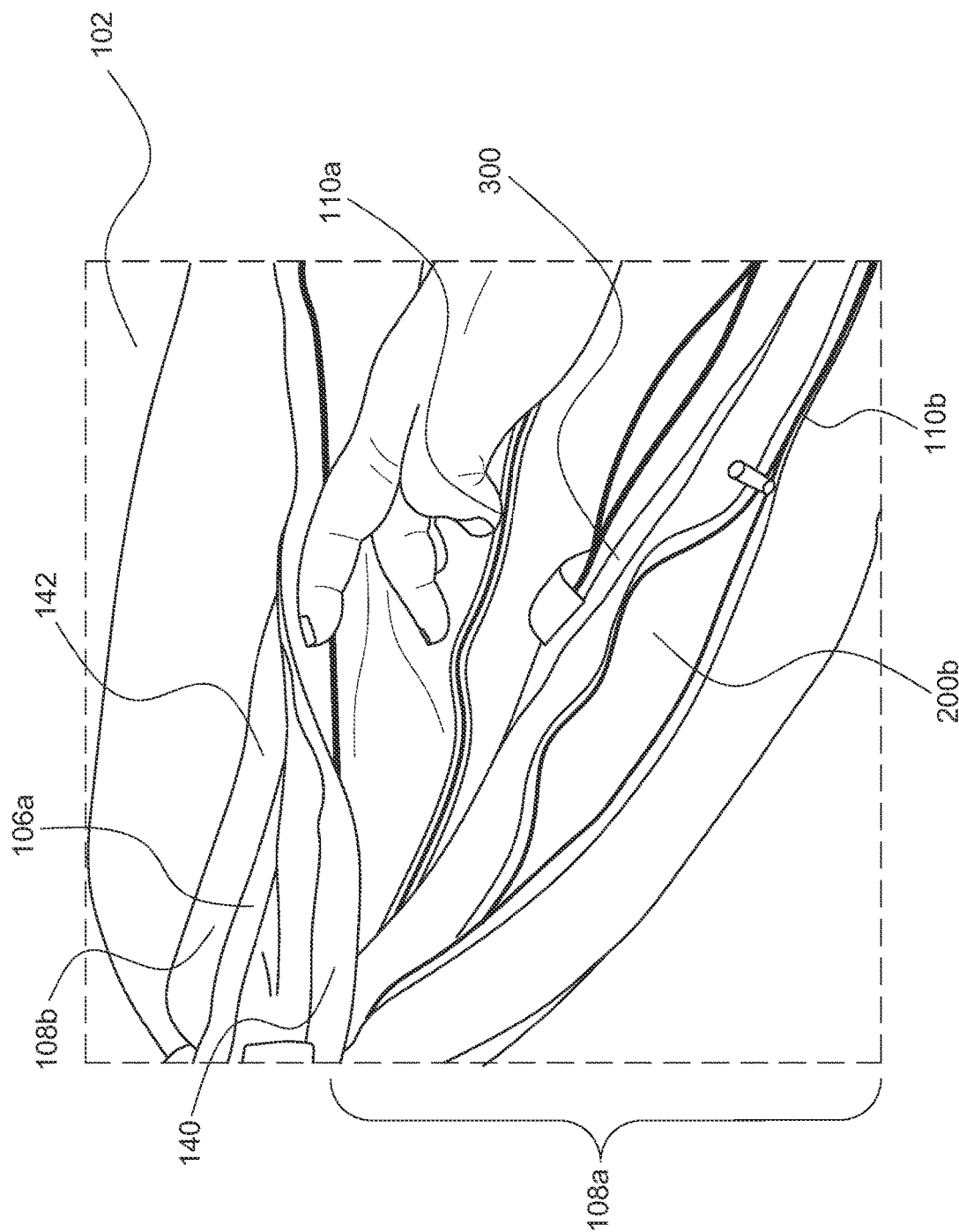
Figure 3C:
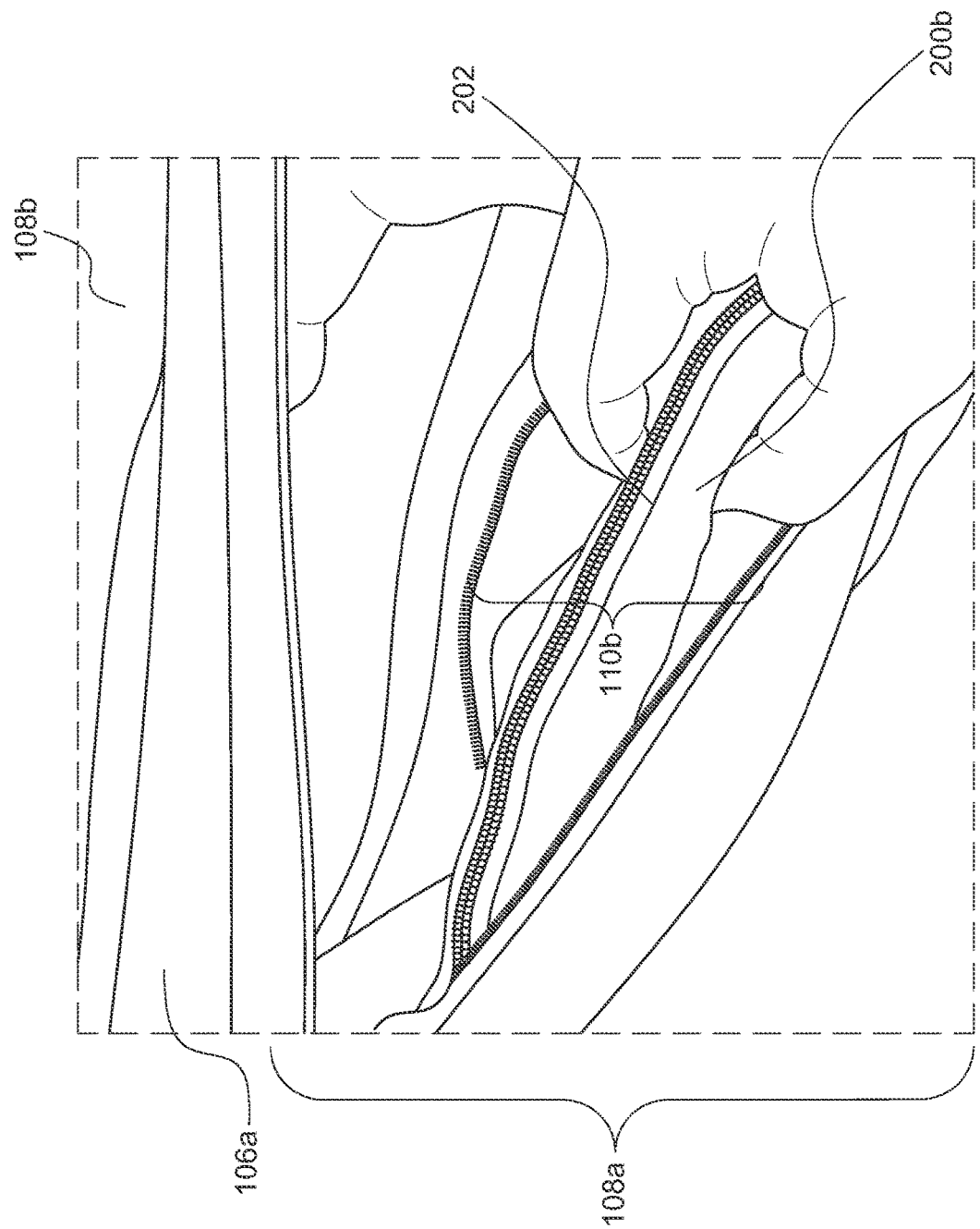

FIGS. 3A-3C show exemplary configurations of the first pocket 108a on the first side surface 106a of the housing 100, according to an embodiment of the present disclosure. As shown in FIG. 3B, the first pocket 108a may be opened, via the first pocket mechanical connector 130, to access the plurality of layers 200a, 200b, 300. In some embodiments, the plurality of layers 200a, 200b, 300 comprises at least one foam layer. The at least one foam layer may include, but is not limited to, at least one of the following materials: polyester, compressed polyester, polyester fiberfill, polyurethane, open cell foam, closed cell foam, polyethylene, latex foam, memory foam, and gel foam. In some embodiments, the plurality of layers 200a, 200b, 300 comprises a first foam layer 200a, a second foam layer 200b, and an organizer 300 between the first and second foam layers 200a, 200b. In some embodiments, the first foam layer 200a may comprise a different material, thickness, and/or density than the second foam layer 200b. In a preferred embodiment, the first foam layer 200a is positioned underneath the top surface 102 of the housing 100 and comprises a memory foam configured to provide a comfortable resting material for a pet, and the second foam layer 200b is positioned underneath the first foam layer 200a and comprises a denser foam configured to provide structural integrity to the pet bed 10 and extra cushioning against the ground.

As shown in FIG. 3B, within the first pocket 108a, the first foam layer 200a (not shown) may be positioned within a first sub-pocket 110a and the second foam layer 200b may be positioned within a second sub-pocket 110b. The first and second sub-pockets 110a, 110b may be opened and closed with mechanical connectors. Furthermore, as shown in FIG. 3C, each of the first and second foam layers 200a, 200b may be further nested within an individual casing 202, wherein the casing comprises yet another mechanical connector, for directly accessing the foam material.

Figure 3D:
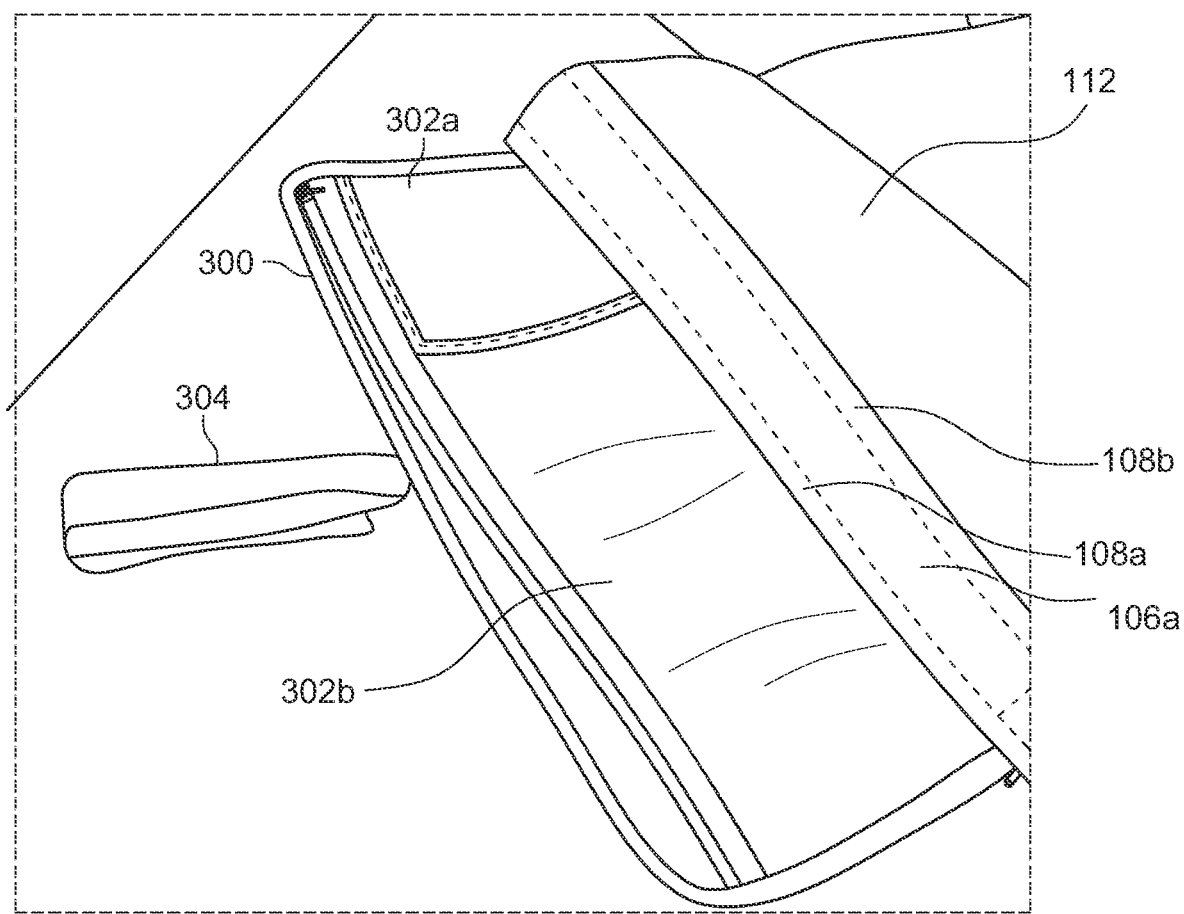
FIG. 3D shows an exemplary configuration of an organizer being slidably removed from the pet bed housing, according to an embodiment of the present disclosure.
Figure 3E:
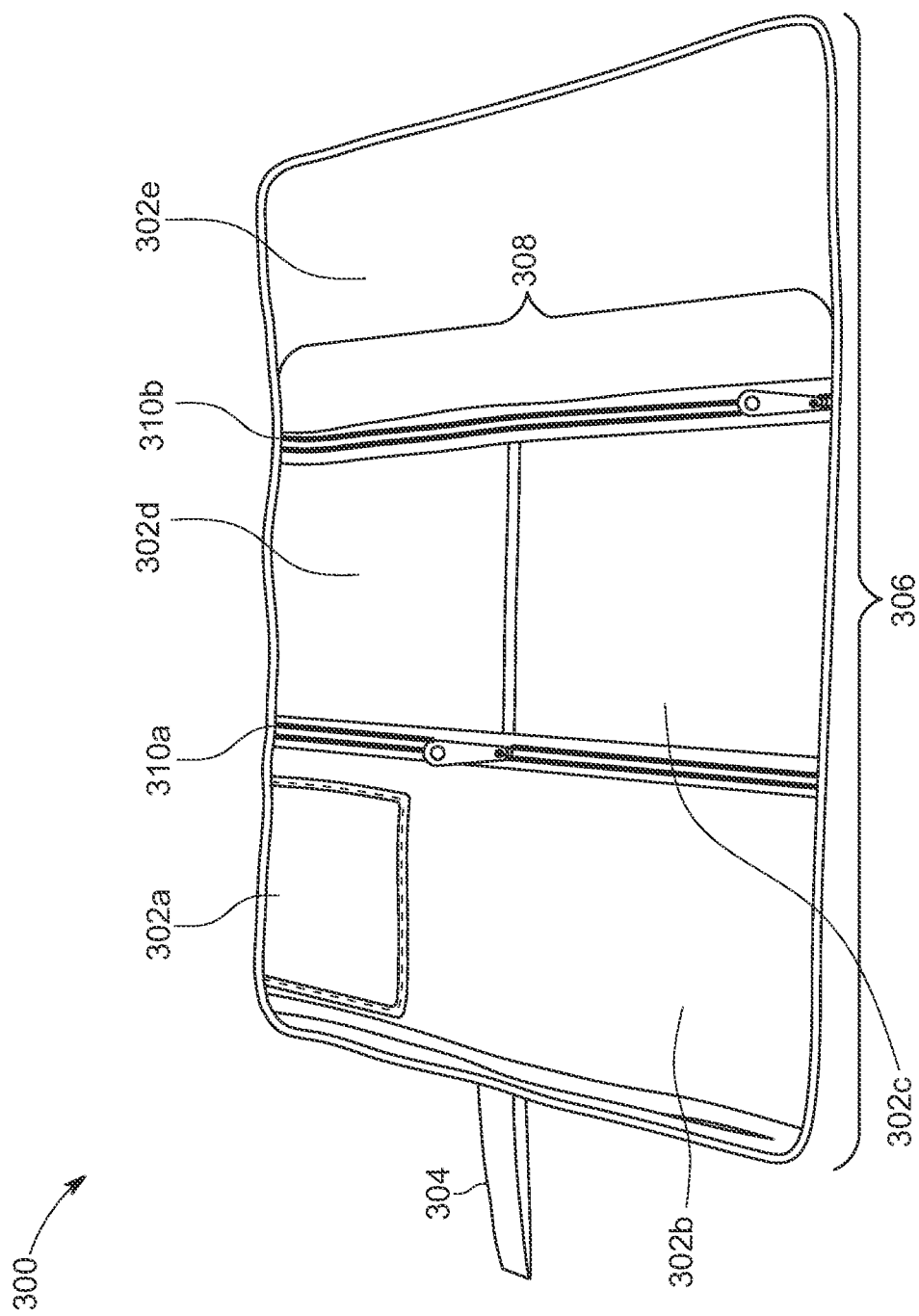
FIG. 3E shows a top view of an exemplary organizer, according to an embodiment of the present disclosure.

As set forth above, at least one of the plurality of layers 200a, 200b, 300 located between the top 102 and bottom surfaces 104 of the housing 100 comprises an organizer 300. As shown in FIGS. 3D-3E, the organizer 300 comprises a plurality of compartments 302a, 302b, 302c, 302d, 302e for storing pet supplies (not shown), such as food (including treats, snacks, and bones), food containers, waste bags, medications, medical ID cards, toys, brushes, leashes, collars, harnesses, and pet clothing. In some embodiments, the plurality of compartments 302a, 302b, 302c, 302d, 302e may be opened and closed by mechanical connectors. In some embodiments, the plurality of compartments 302a, 302b, 302c, 302d, 302e may all be the same size or may be different sizes. In a preferred embodiment, at least some of the plurality of compartments 302a, 302b, 302c, 302d, 302e are different sizes so as to accommodate different-sized pet supplies. In some embodiments, at least one 302a of the plurality of compartments 302a, 302b, 302c, 302d, 302e may be configured to receive a pet medical ID card and/or travel checklist. In some embodiments, the organizer may comprise a fabric backing and the plurality of compartments 302a, 302b, 302c, 302d, 302e may comprise a plastic film or laminate.

In some embodiments, a length 306 and a width 308 of the organizer 300 is approximately equal to the length 120 and the width 122 of the housing 100. Therefore, when the organizer 300 is positioned within the first pocket 108a and between the top surface 102 and the bottom surface 104 of the housing 100 in the sleeping position, it can lay substantially flat. The organizer 300 is also not coupled to anything within the housing, and therefore it can be slidably removed from and reinserted into the first pocket 108a with ease (as shown in FIG. 3D). Specifically, the organizer 300 can be slid or moved smoothly between the top 102 and bottom surfaces 104 of the housing 100. In some embodiments, where the first pocket 108a extends around to at least two other side surfaces of the housing 100, such that the housing 100 is capable of opening up like a suitcase, the organizer 300 can simply be positioned between the top 102 and bottom surfaces 104 of the housing 100. The organizer 300 is also foldable along a plurality of crease portions 310a, 310b to produce a stacked configuration and unfoldable to produce an unstacked configuration. The crease portions 310a, 310b facilitate rolling up of the organizer 300 when inserted into the housing 100, and when the housing 100 is folded or rolled from the sleeping position into the transporting position.

The organizer 300 may further comprise an extendible handle strap 304 at a distal end thereof, wherein the extendible handle strap 304 is configured to hang the organizer 300 on different sized objects. For instance, the extendible handle 304 may be used to hang the organizer 300 from a tree trunk or tree branch, a pole, a car roof rack, a hook in a closet, a clothing rack, a towel rack, or a tent to easily access the pet supplies stored therein.

Figure 4A:
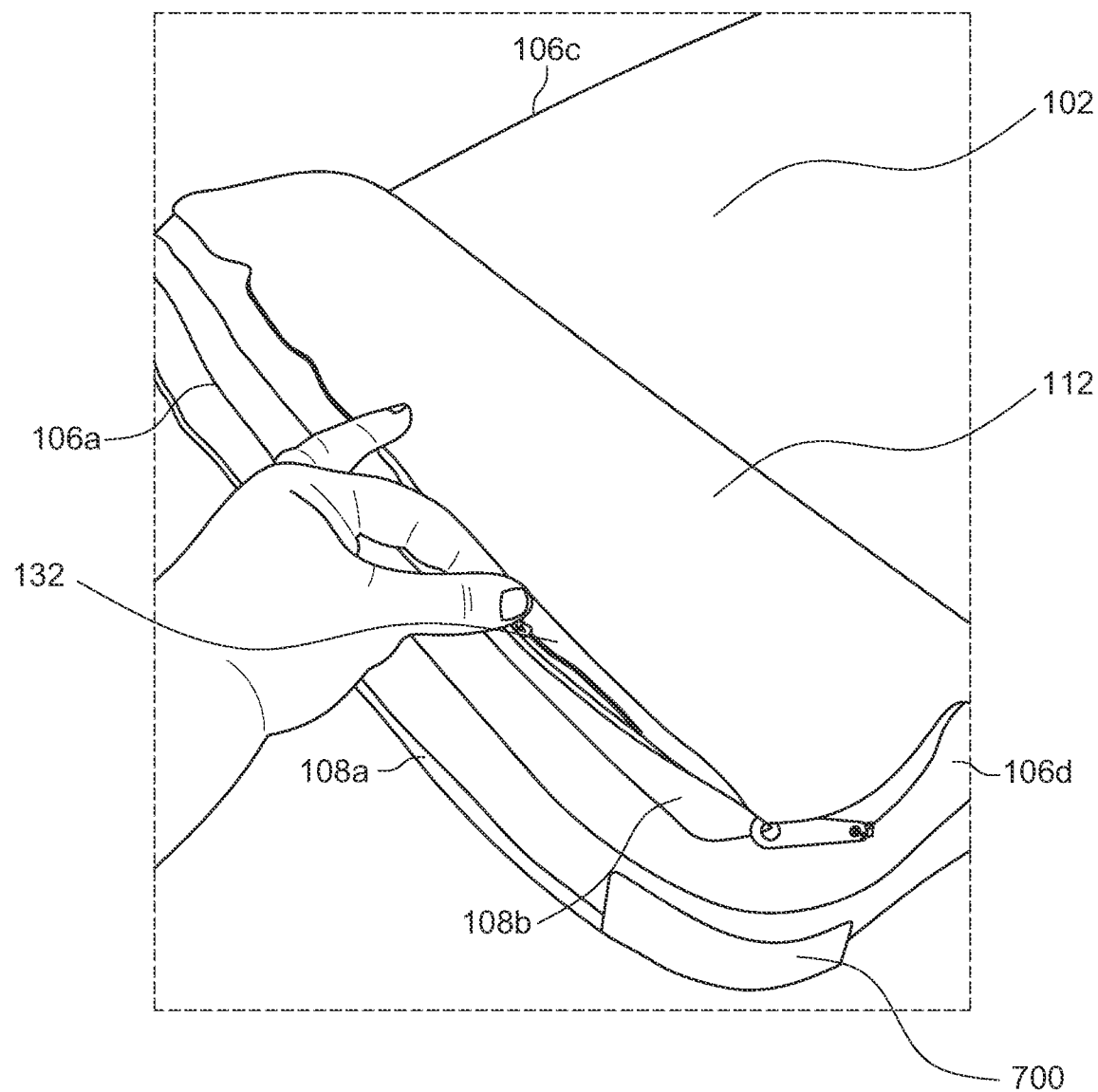
FIGS. 4A-4B show exemplary configurations of a second pocket on the first side surface of the pet bed housing, according to an embodiment of the present disclosure.
Figure 4B:
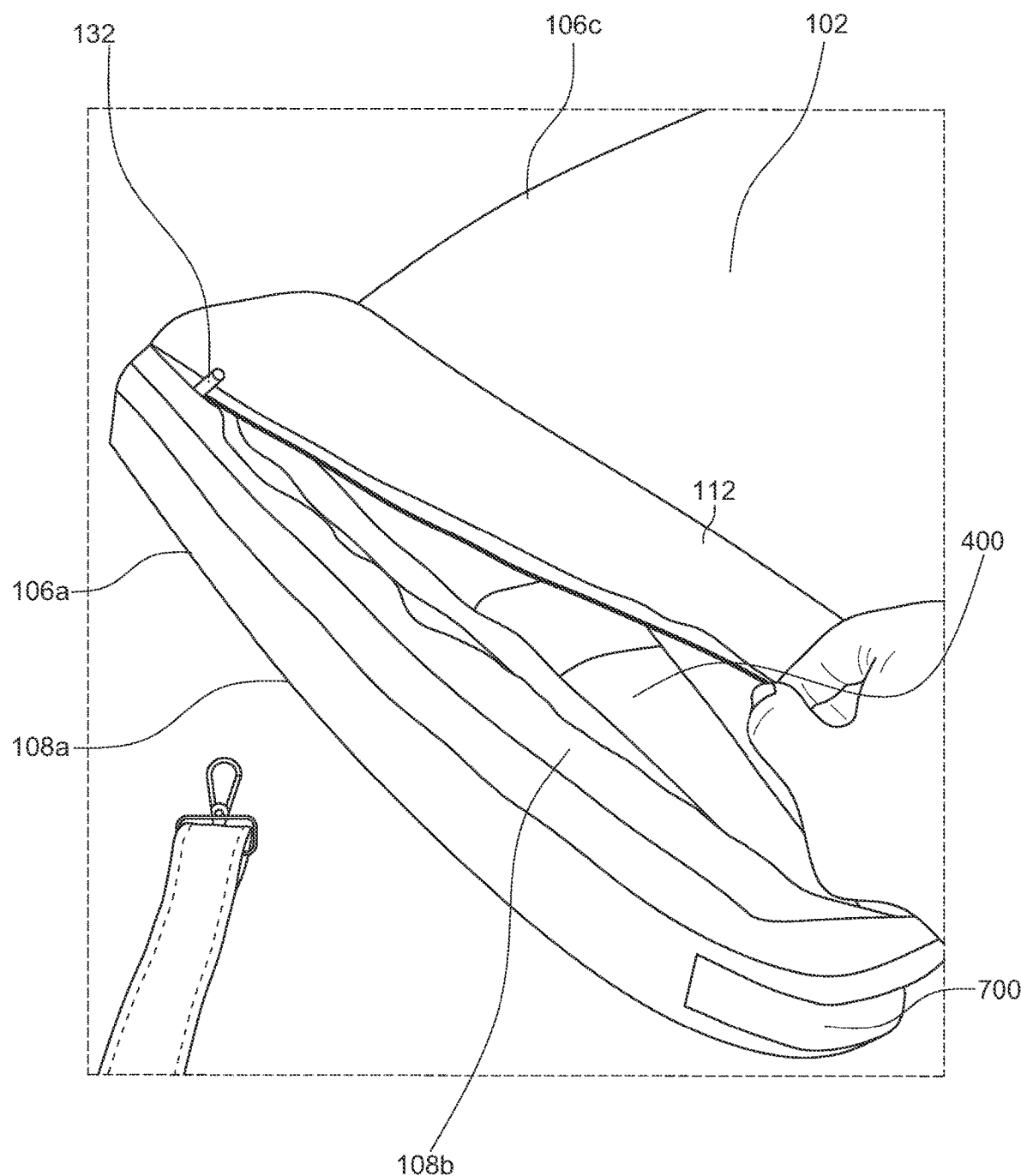

The housing 100 may further comprise a second pocket 108b. FIGS. 4A-4B show exemplary configurations of a second pocket 108b on the first side surface 106a of the housing 100, according to an embodiment of the present disclosure. The second pocket 108b may be opened and closed by a second pocket mechanical connector 132. In a preferred embodiment, the second pocket mechanical connector 132 comprises a zipper. In some embodiments, the second pocket mechanical connector 132 is covered with a second hood 142, wherein the second hood 142 comprises a material such as that described above with regard to the first hood 140.

As shown in FIG. 4B, the pet bed 10 further comprises a cover 400 that is removable from the second pocket 108b. The cover 400 is rollable to produce a rolled configuration and unrollable to produce an unrolled configuration. The rolled configuration allows the cover 400 to be received within the second pocket 108b, therein forming a support cushion 112 under the top surface 102 of the housing. The support cushion 112, projecting above the remainder of the top surface 102 of the housing 100, may serve as a bolster, pillow, or resting place on which a pet can lay its head for greater comfort and support while resting on the top surface 102 of the housing 100, when the housing 100 is in the sleeping position. The support cushion 112 may be delineated from the remainder of the top surface 102 of the housing 100 by a stitching line 102a across the width 122 of the housing (as shown in FIG. 1A).

In some embodiments, a first mechanical connector 114 is used to detachably secure the cover 400 to an inside surface of the second pocket 108b. In a preferred embodiment, the first mechanical connector 114 comprises a zipper. The first mechanical connector 114 allows the cover 400 to be completed detached from an inside surface of the second pocket 108b and removed for washing or cleaning. The detached cover 400 may also be used as a blanket to keep a pet warm or comforted, even when the pet is not resting on the pet bed 10. Furthermore, the detached cover 400 may be used as a protective covering in cars, airplanes, trains, and on furniture inside homes, hotels, and other indoor travel lodgings, for instance, to protect indoor furnishings from dirt, mud, and/or pet hair. The first mechanical connector 114 may also be used to secure the cover 400 to the housing 100, so that the cover 400 can be used as a blanket or covering while the pet is resting on the pet bed 10 and when the cover 400 is in the unrolled configuration, as described in further detail below.

Figure 4C:
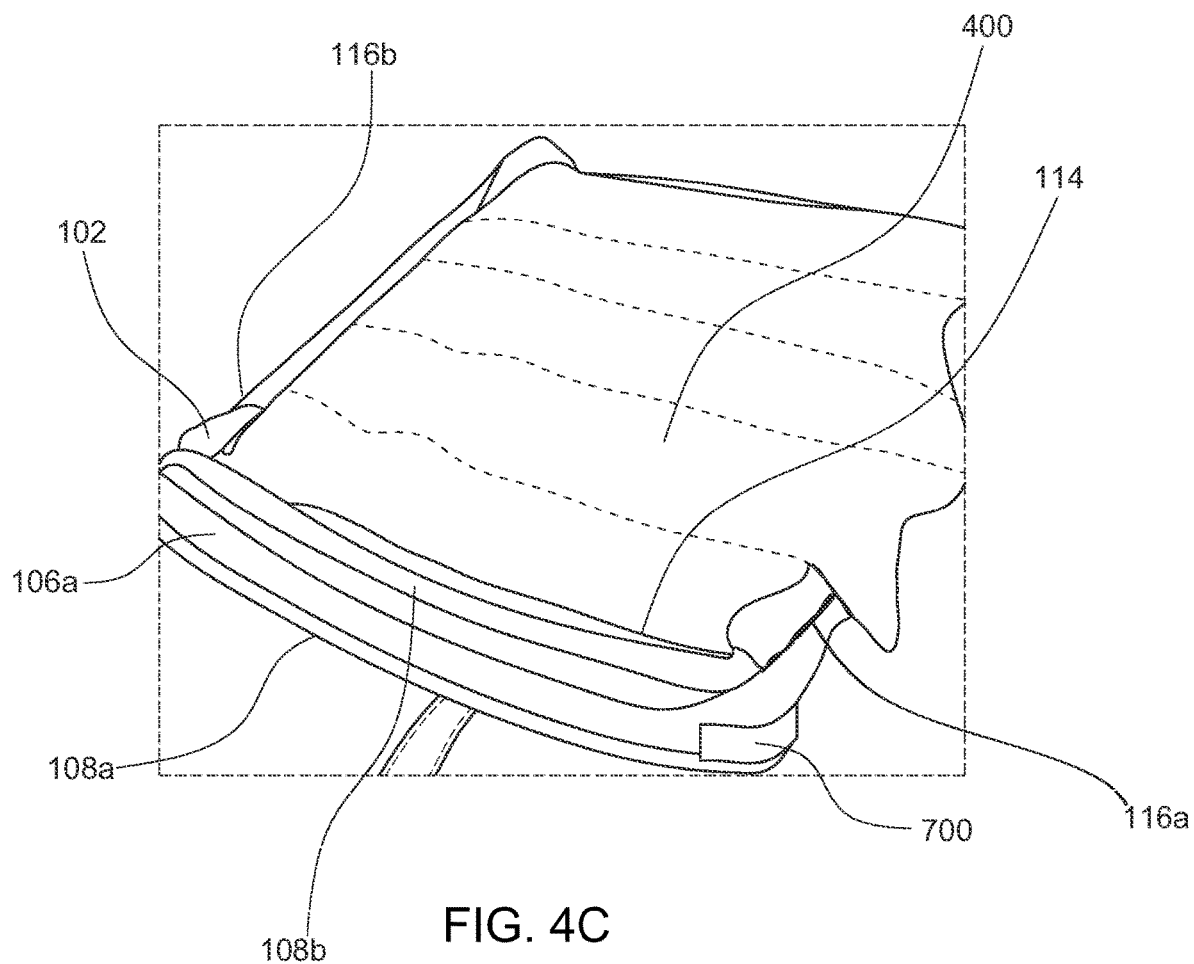
FIG. 4C shows an orthogonal view of an exemplary cover, according to an embodiment of the present disclosure, wherein the cover is in an unrolled configuration.
Figure 4D:
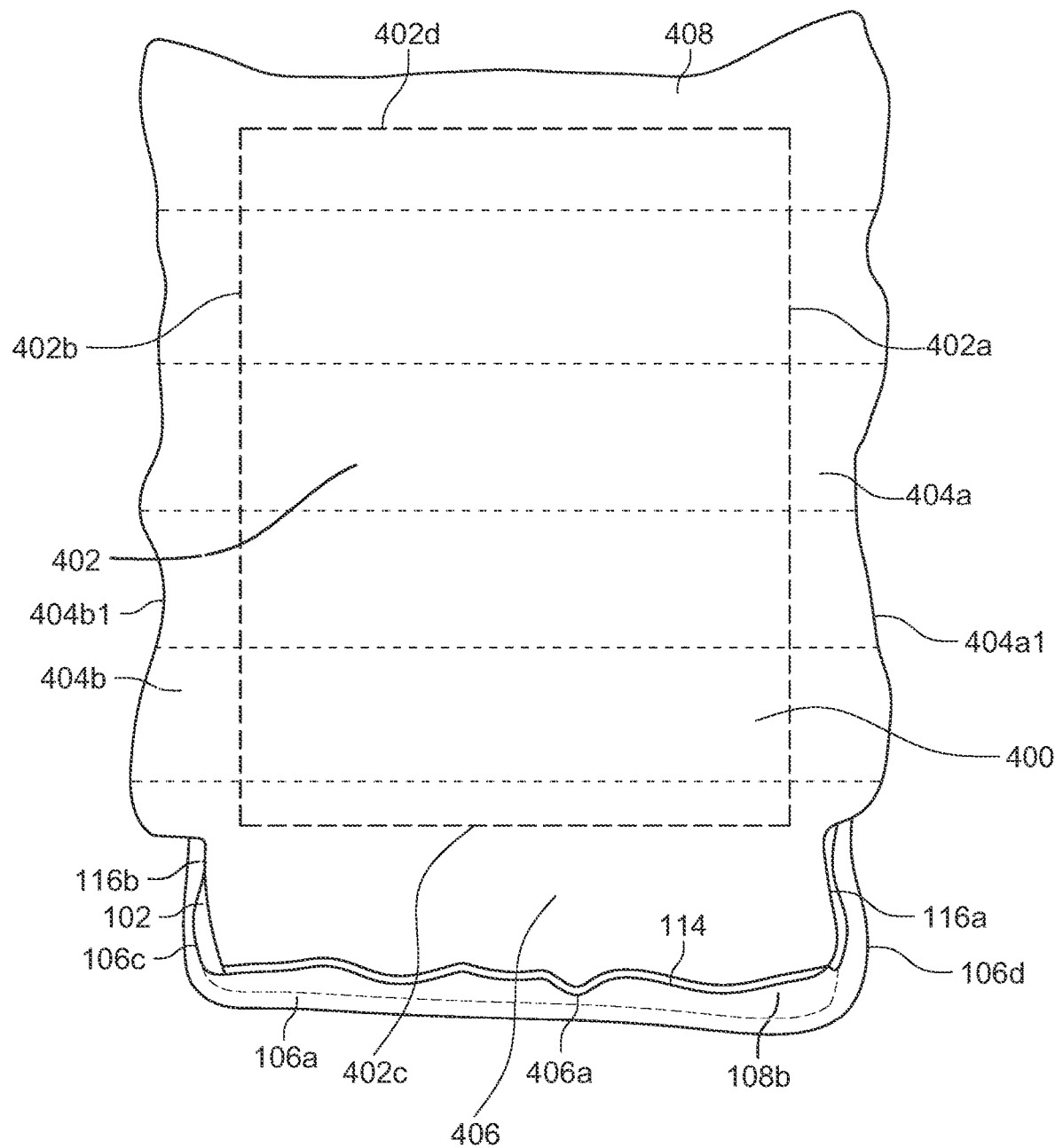
FIG. 4D shows a top view of an exemplary cover, according to an embodiment of the present disclosure, wherein the cover is in an unrolled configuration.

The unrolled configuration allows the cover 400 to extend over at least a portion of the top surface 102 of the housing 100. FIGS. 4C-4D show different views of an exemplary cover 400, according to an embodiment of the present disclosure, wherein the cover 400 is in an unrolled configuration. In some embodiments, the cover 400 comprises a center portion 402, a pair of winged portions 404a, 404b extending from latitudinal sides 402a, 402b of the center portion 402, and a flange portion 406 extending from one longitudinal side 402c of the center portion 402. In some embodiments, an outer edge 406a of the flange portion 406 is detachably secured to the first side surface 106a of the housing 100. In some embodiments, the outer edge 406a of the flange portion 406 is detachably secured via the first mechanical connector 114 to an inside surface of the second pocket 108b on the first side surface 106a of the housing 100. In some embodiments, an outer edge 404a1, 404b1 of each of the pair of winged portions 404a, 404b is detachably secured to opposing third 106c and fourth side surfaces 106d of the housing 100 via a second mechanical connector 116a, 116b. In a preferred embodiment, the second mechanical connector 116a, 116b comprises a zipper.

Figure 4E:
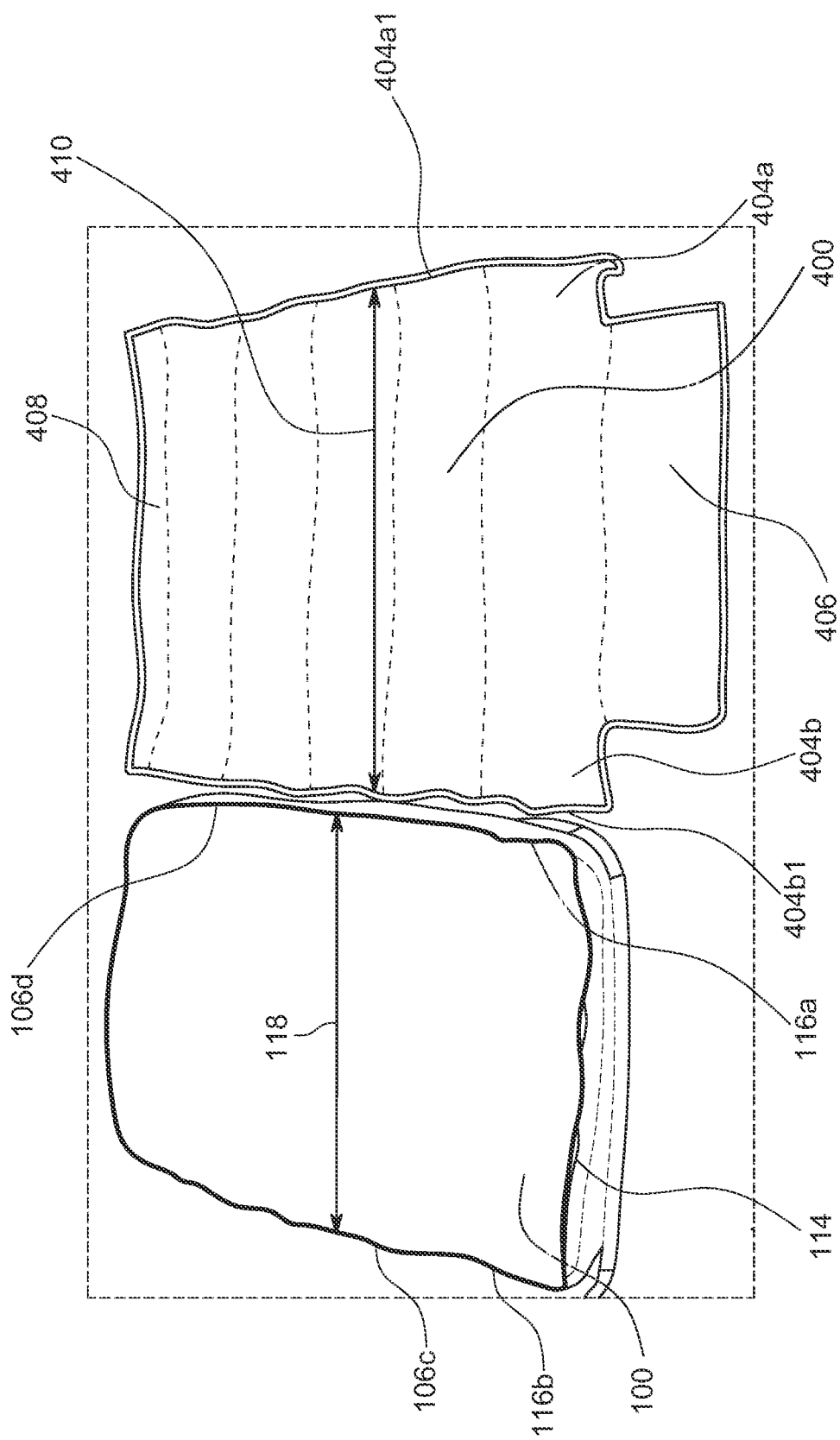
FIG. 4E shows a top view of a side-by-side comparison of a cover and a pet bed housing, according to an embodiment of the present disclosure.

FIG. 4E shows a top view of a side-by-side comparison of the detached cover 400 and the housing 100, according to an embodiment of the present disclosure. In some embodiments, the distance 410 between the outer edges 404a1, 404b1 of the pair of winged portions 404a, 404b of the cover 400 is greater than the distance 118 between the opposing third 106c and fourth side surfaces 106d of the housing 100. Therefore, when the cover 400 is in the unrolled configuration and is secured to the housing 100 via the first mechanical connector 114 and the second connector 116a, 116b, there is room between the cover 400 and the top surface 102 of the housing to accommodate a pet resting thereon. This ultimately allows the cover 400 to serve as a blanket or sheet to provide warmth and comfort to a pet resting on the pet bed 10. The attached cover 400 may also be used to calm a pet suffering from anxiety, fear, or over-excitement, or to protect a pet from inclement weather such as wind, hail, snow, or rain. The cover 400 may also be used for burrowing for smaller pets.

Figure 4F:
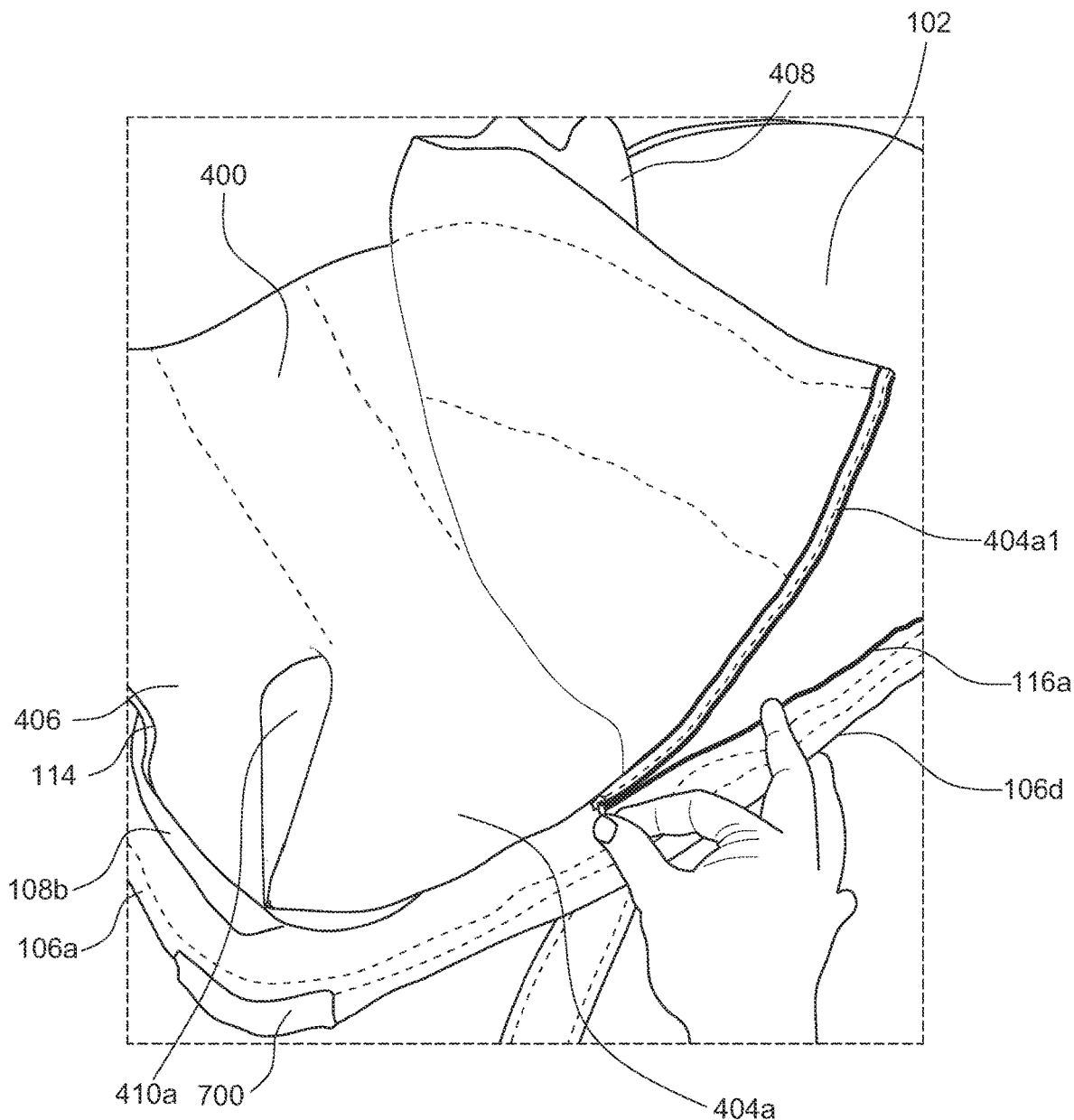
FIG. 4F shows an orthogonal view of the cover being secured to at least a portion of the pet bed housing, according to an embodiment of the present disclosure.
Figure 4G:
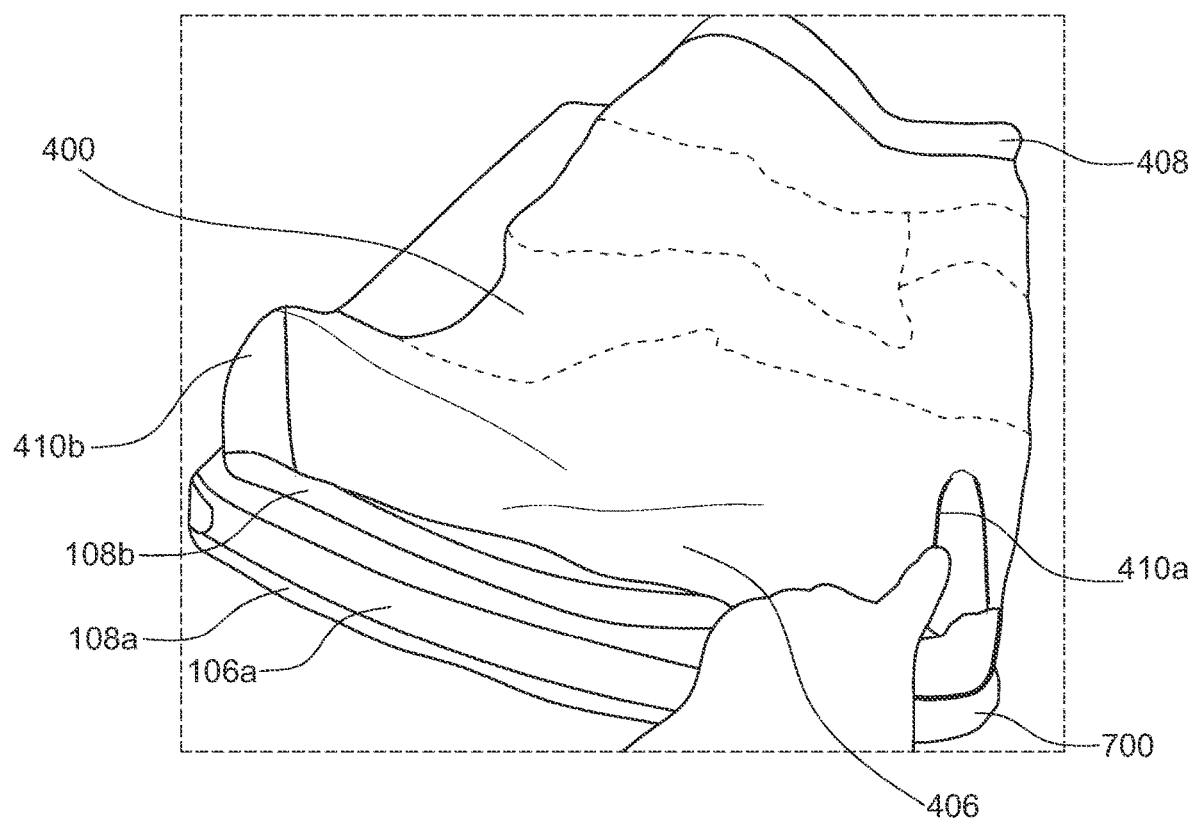
FIG. 4G shows exemplary configurations of vent holes formed between the cover and a top surface of the pet bed housing, according to an embodiment of the present disclosure.

FIG. 4F shows the cover 400 being secured to at least a portion of the housing 100, according to an embodiment of the present disclosure. As shown in FIGS. 4F-4G, when the outer edge 406a of the flange portion 406 is secured to the first side surface 106a of the housing 100 via the first mechanical connector 114, and the outer edges 404a1, 404b1 of each of the pair of winged portions 404a, 404b are secured to the third 106c and fourth side surfaces 106d of the housing 100 via the second mechanical connector 116a, 116b, vent holes 410a, 410b are formed between each of the pair of winged portions 404a, 404b and the flange portion 406. These vent holes 410a, 410b allow for air flow between the cover 400 and the top surface 102 of the housing 100 to provide some temperature control. For instance, the vent holes 410a, 410b may allow for cooling air to flow from the outside and into the vent holes 410a, 410b, ultimately decreasing the temperature between the cover 400 and the top surface 102 of the housing 100.

In some embodiments, the cover 400 may comprise a material such as those materials described above with respect to the top surface 102 of the housing 100. In some embodiments, the cover 400 may comprise multiple layers, or at least one layer within an outer shell. For instance, in some embodiments (not shown), the cover 400 comprises a first side layer comprising a soft material such as those materials described above with respect to the top surface 102 of the housing 100, and a second side layer comprising a durable and/or moisture-wicking material, such as those described above with respect to the bottom layer 104 of the housing 100. In this configuration, the first side layer comprising the soft material may be used against the body of a pet to keep the pet warm and comforted, and the second side layer comprising the durable and/or moisture-wicking material layer may be used as an outer layer to protect the pet from the elements. In other embodiments, the cover 400 may comprise a soft material within a durable and/or moisture-wicking outer shell. In some embodiments, the cover 400 further comprises a moisture-repellant coating or finish to protect the cover 400 and/or the housing 100 from dampness.

In some embodiments, the cover 400 further comprises a structural insert 408 at a second longitudinal side 402d of the center portion 402, opposite the longitudinal side 402c with the flange portion 406 extending therefrom, wherein the structural insert 408 allows the cover 400 to be rolled from the unrolled configuration to the rolled configuration. In some embodiments, the structural insert 408 is a piece of foam.

Figure 4H:
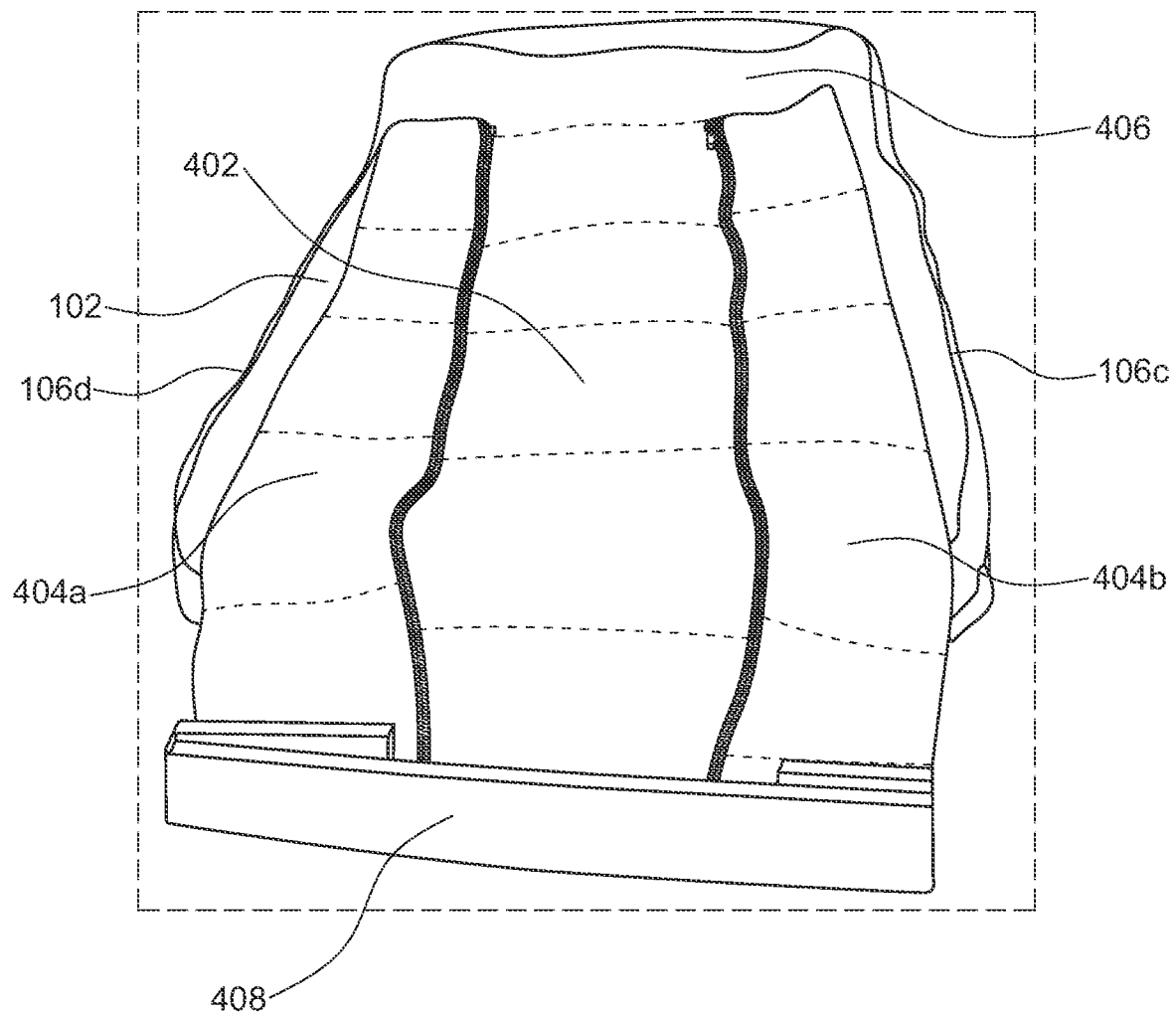
FIGS. 4H-4J show exemplary configurations wherein the cover of FIGS. 4C-4G is folded, or rolled, from the unrolled configuration into a rolled configuration, according to an embodiment of the present disclosure.
Figure 4I:
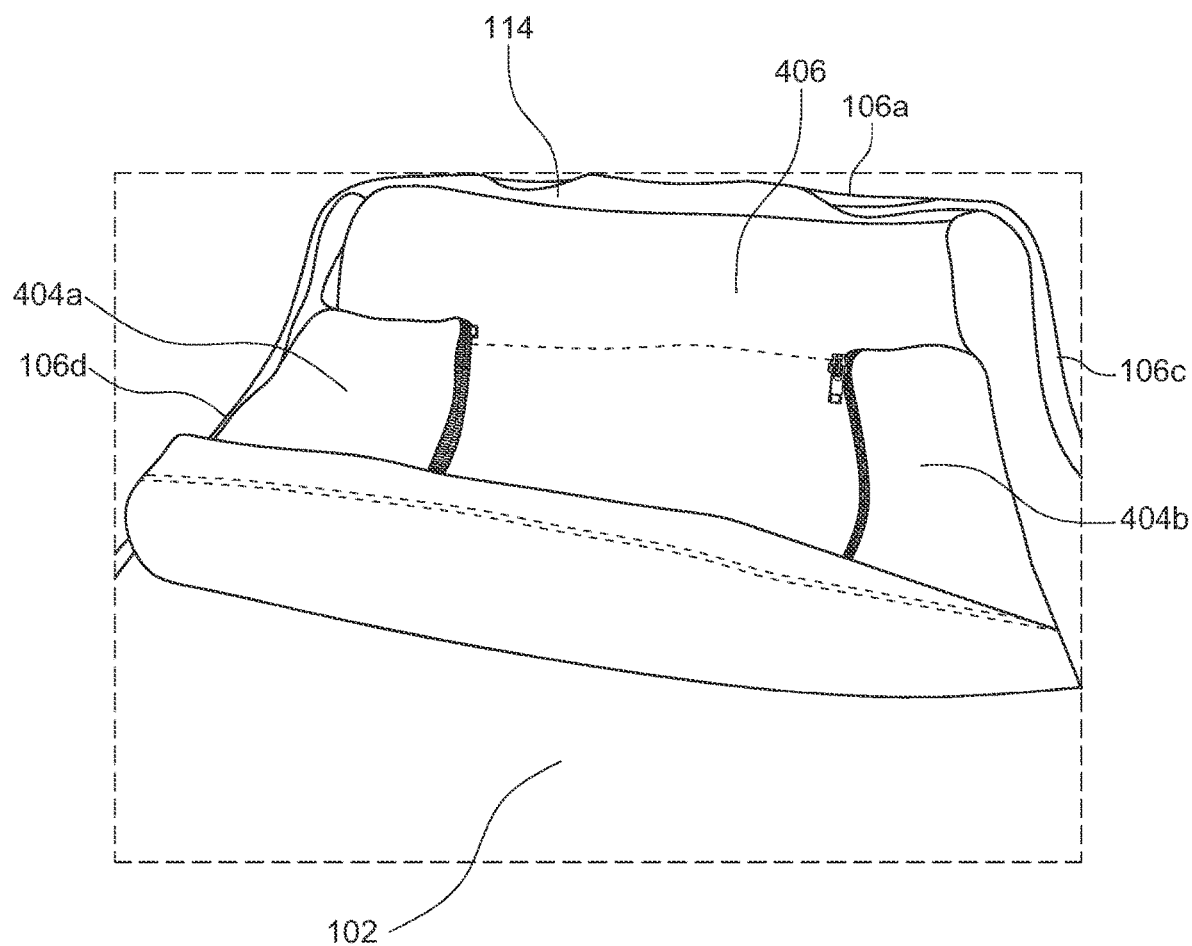
Figure 4J:
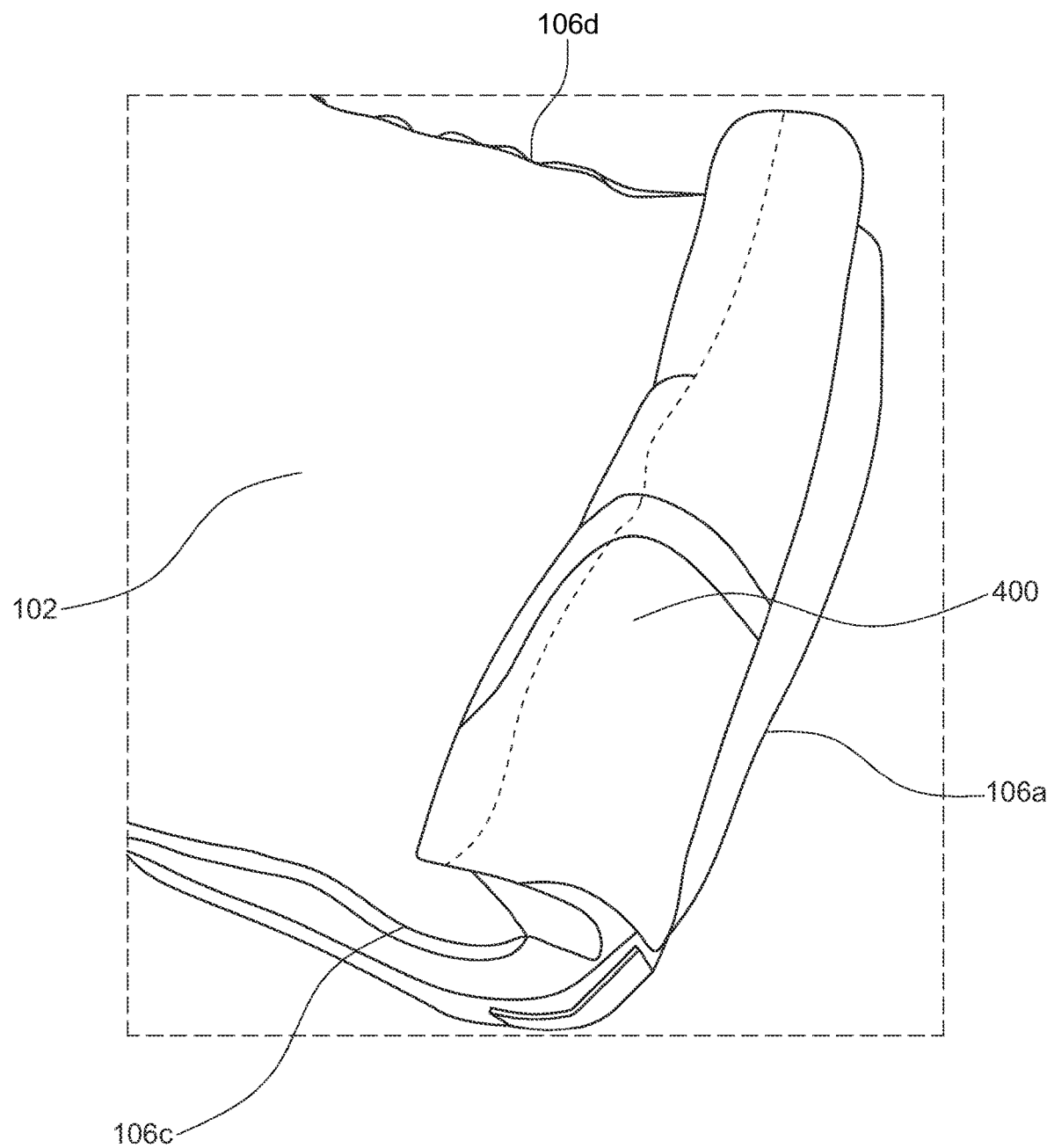
Figure 4K:
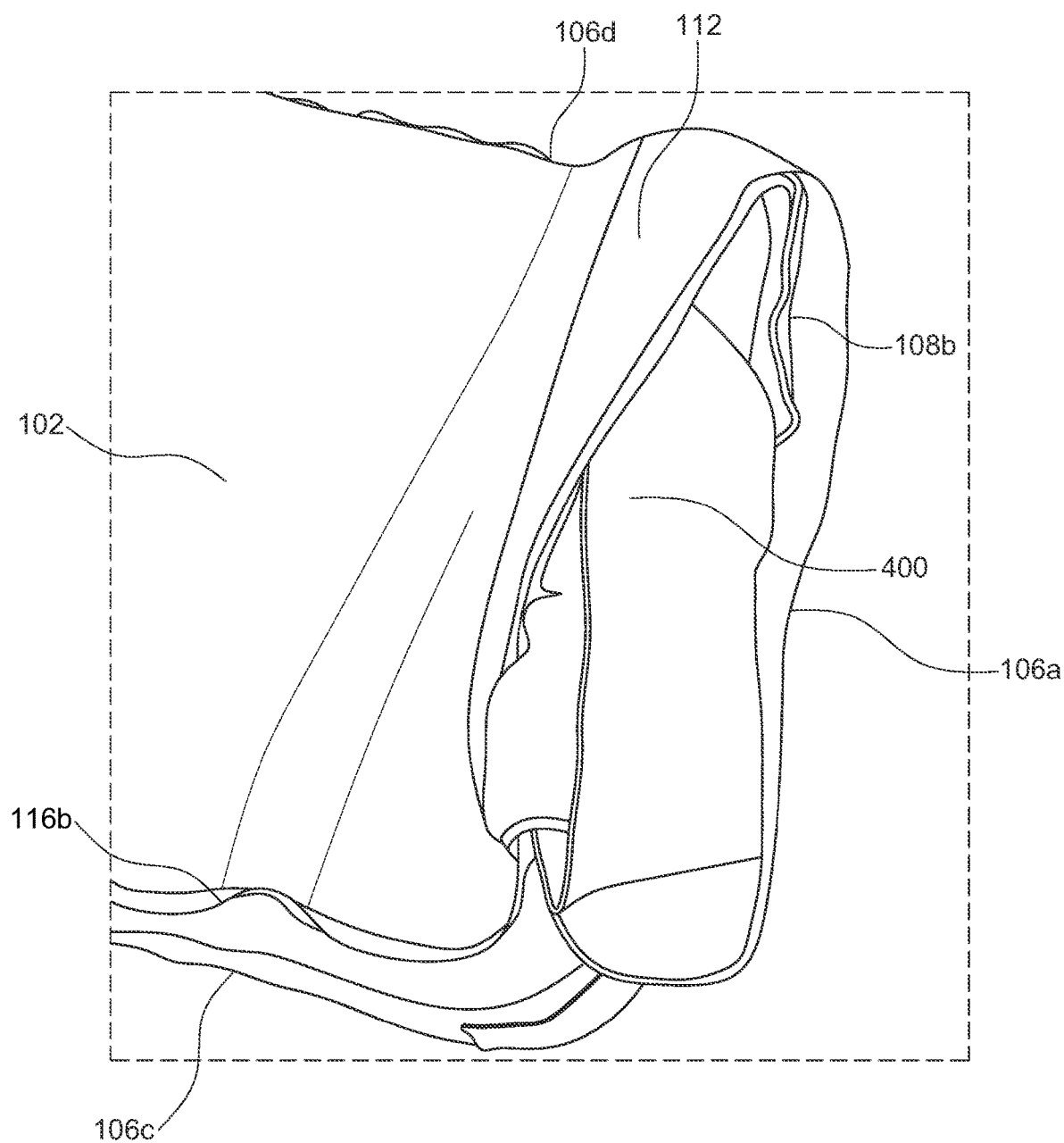
FIG. 4K shows an exemplary configuration, wherein the cover of FIGS. 4C-4J is received within the second pocket on the first side surface of the pet bed housing, according to an embodiment of the present disclosure.

FIGS. 4H-4J show exemplary configurations wherein the cover 400 of FIGS. 4C-4G is folded, or rolled, from the unrolled configuration into a rolled configuration, according to an embodiment of the present disclosure. For instance, as shown in FIG. 4H, the outer edges 404a1, 404b1 of each of the pair of winged portions 404a, 404b may be detached from the third 106c and fourth side surfaces 106d of the housing 100 via the second mechanical connector 116a, 116b, and the winged portions 404a, 404b may be folded onto the center portion 402 of the cover. The structural insert 408 may then be used to roll the cover 400 towards the first side surface 106a of the housing. With the outer edge 406a of the flange portion 406 still secured via the first mechanical connector 114 to an inside surface of the second pocket 108b, the cover 400, now in the rolled configuration (FIG. 4J), can be received within the second pocket 108b on the first side surface 106a of the housing 100 to form the support cushion 112 (FIG. 4K).

Figure 5A:
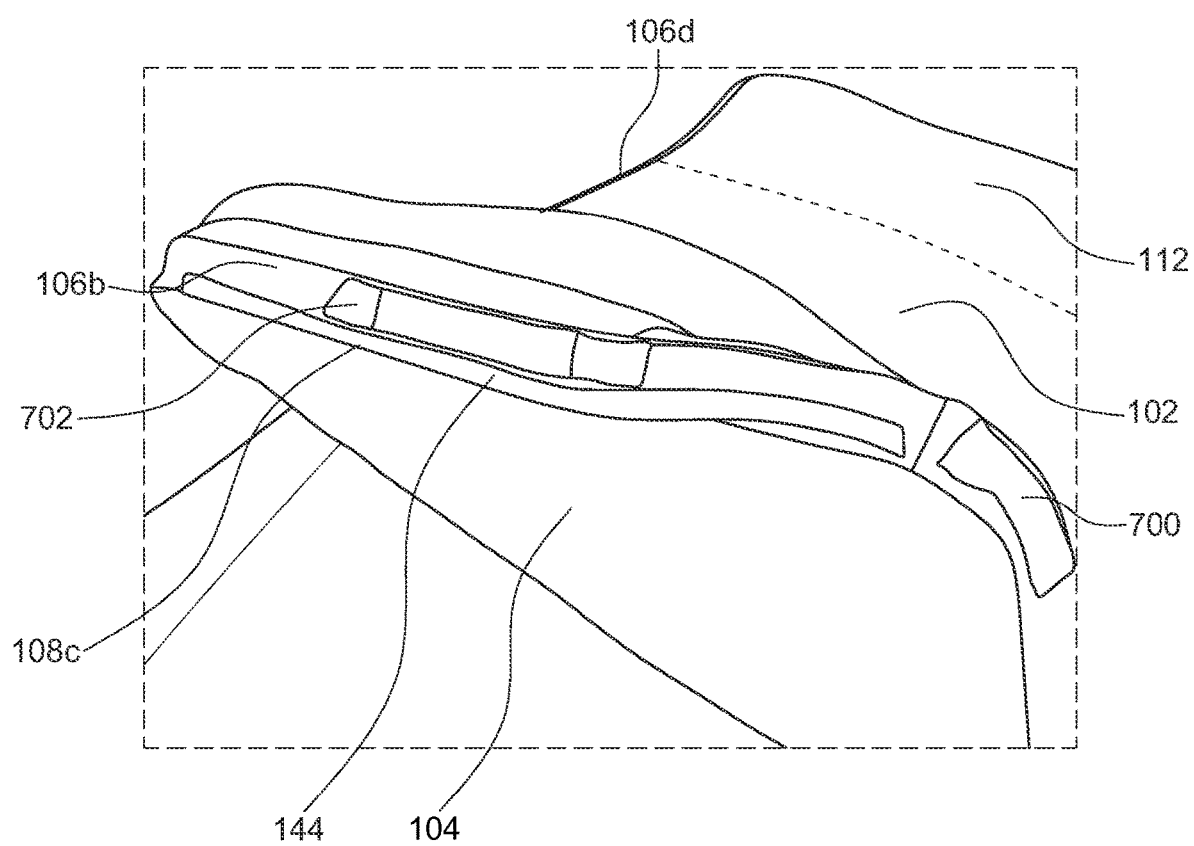
FIGS. 5A-5B show exemplary configurations of a third pocket on a second side surface of the pet bed housing, according to an embodiment of the present disclosure.
Figure 5B:
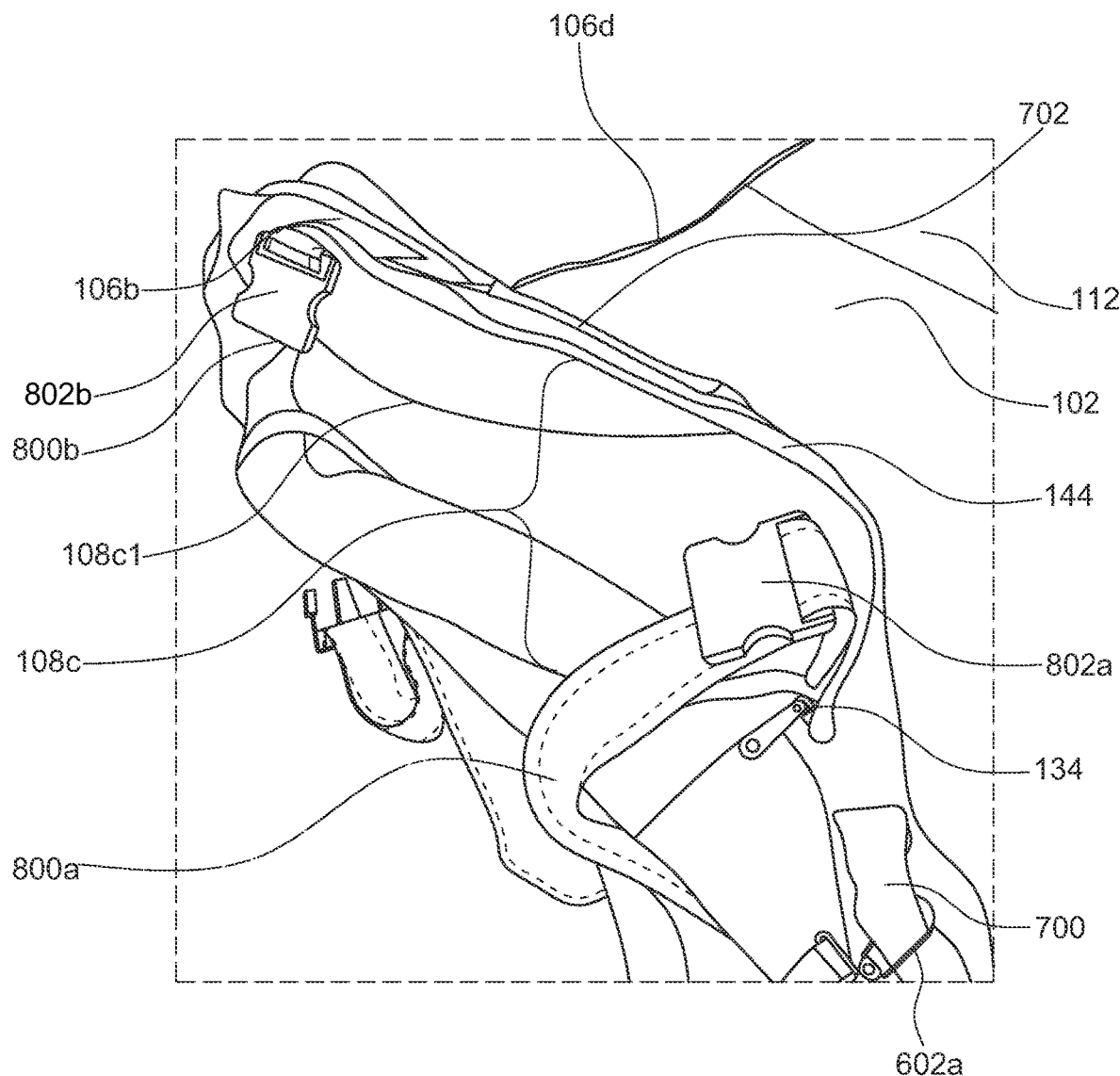

The housing 100 may further comprise a third pocket 108c. In some embodiments, as shown in FIGS. 5A-5B, the third pocket 108c is located on the second side surface 106b of the housing 100, and can be opened and closed by a third pocket mechanical connector 134. In a preferred embodiment, the third pocket mechanical connector 134 comprises a zipper. In some embodiments, the third pocket mechanical connector 134 is covered with a third hood 144, wherein the third hood 144 comprises a material such as that described above with regard to the first hood 140. In some embodiments, as shown in FIG. 5B, the at least one fastener 800a, 800b used to secure the housing 100 in the transporting position, as described above with regard to FIG. 1E, is coupled to an inside surface 108c1 of the third pocket 108c by at least one mechanical connector (not shown) or by sewing. In a preferred embodiment, the at least one fastener 800a, 800b is sewn to the inside surface 108c1 of the third pocket 108c. This ultimately ensures that the at least one fastener 800a, 800b is always available for use and will not become lost or misplaced by the user. Furthermore, once the housing 100 is unfolded from the transporting position into the sleeping position, the at least one fastener 800a, 800b can be stored within the closed third pocket 108c, to prevent a pet from chewing on, choking on, and/or consuming the at least one fastener 800a, 800b. In some embodiments, the third pocket 108c may also be used to store and transport additional small supplies.

At least one handle portion 700 may be provided on at least one of the four side surfaces 106a, 106b, 106c, 106d of the housing 100 or on at least one corner of the housing 100 where one side surface abuts an adjacent side surface. The at least one handle portion 700 may comprise a loop of fabric for, e.g., hanging the pet bed 10 for drying or cleaning, or to access the supplies stored therein, or for connecting the first and second attachment mechanisms 602a, 602b of the carry strap 600. The at least one handle portion 700 may comprise a material such as the material of the bottom surface 104 of the housing 100 described above. In a preferred embodiments, the at least one handle portion 700 comprises nylon. In some embodiments, the handle portion 700 further comprises a reflective material, for instance, so as to be more easily viewable at night. The at least one handle portion 700 may also be in a different color than the rest of the housing 100 to indicate the location of the at least one handle portion 700 for purposes of hanging the pet bed 10 or connecting the carry strap 600. At least one carry handle 702 may also be provided on the housing 100, wherein the carry handle 702 comprises a larger loop of fabric that than of the at least one handle portion 700, and is configured to allow the user to carry the pet bed 10 by hand. The carry handle 702 may comprise the same material as the handle portions 700, and may also be a different color than the rest of the housing. In some embodiments, the carry handle 702 may be adjustable in size.

Figure 6A:
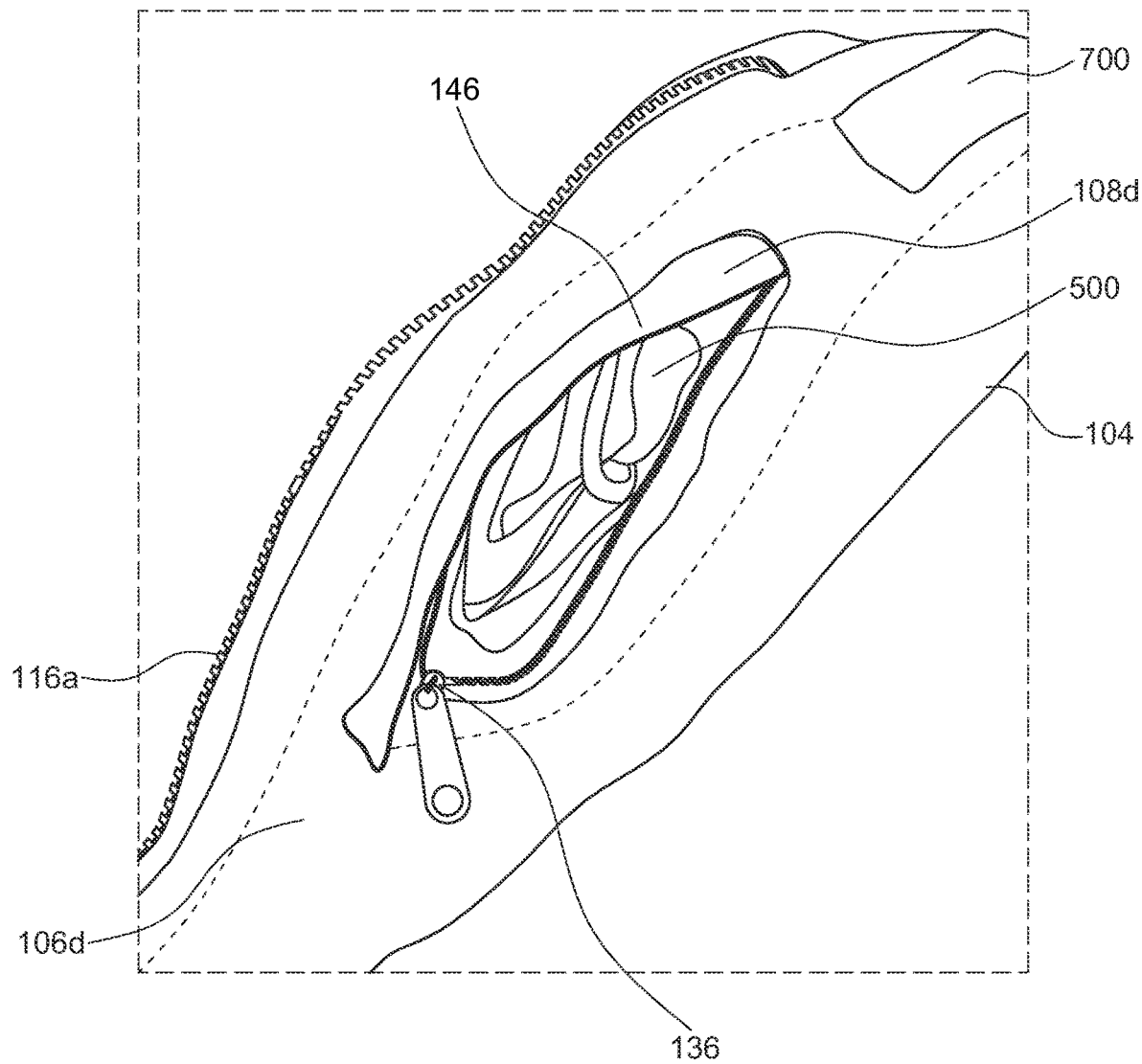
FIG. 6A shows an exemplary configuration of a fourth pocket on a fourth side surface of the pet bed housing, according to an embodiment of the present disclosure.
Figure 6B:
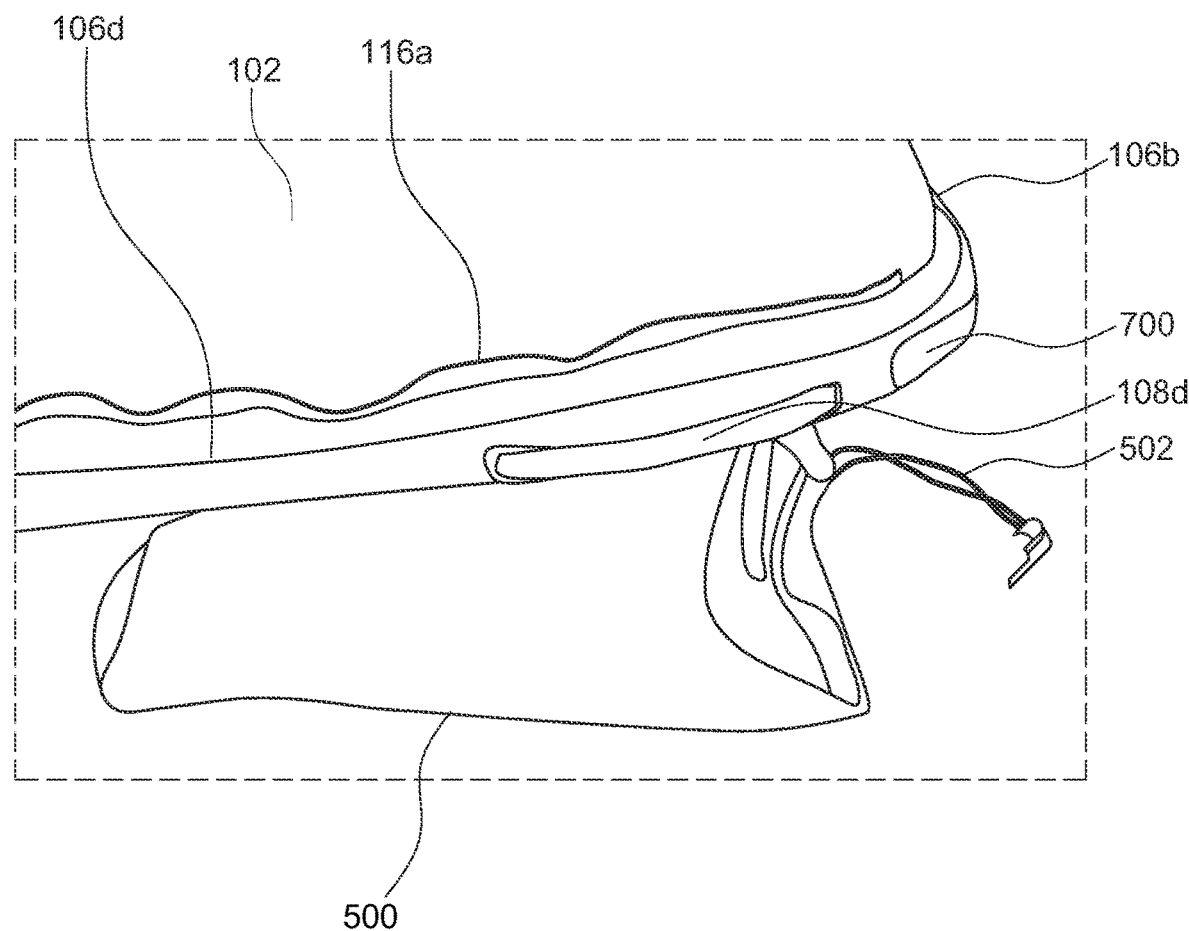
FIG. 6B shows an exemplary mesh bag, according to an embodiment of the present disclosure.

The housing 100 may further comprise a fourth pocket 108d. In some embodiments, as shown in FIG. 6A, the fourth pocket 108d is located on the fourth side surface 106d of the housing 100, and can be opened and closed by a fourth pocket mechanical connector 136. In a preferred embodiment, the fourth pocket mechanical connector 136 comprises a zipper. In some embodiments, the fourth pocket mechanical connector 134 is covered with a fourth hood 146, wherein the fourth hood 146 comprises a material such as that described above with regard to the first hood 140. In some embodiments, a mesh bag 500 is coupled to an inside surface of the fourth pocket 108d. The mesh bag 500 may be collapsible so as to fit within the fourth pocket 108d (as in FIG. 6A) and expandable so as to accommodate a supply item (not shown), such as a water bottle, when the mesh bag 500 is pulled out of the fourth pocket 108d (as in FIG. 6B). In some embodiments, the mesh bag 500 comprises a cinching mechanism 502 to open and close the mesh bag. In a preferred embodiment, the cinching mechanism 502 is a drawstring. In other embodiments, the fourth pocket 108d comprises a lined pouch, wherein the lined pouch comprises a solid material or solid bag, rather than a mesh bag.

Figure 7:
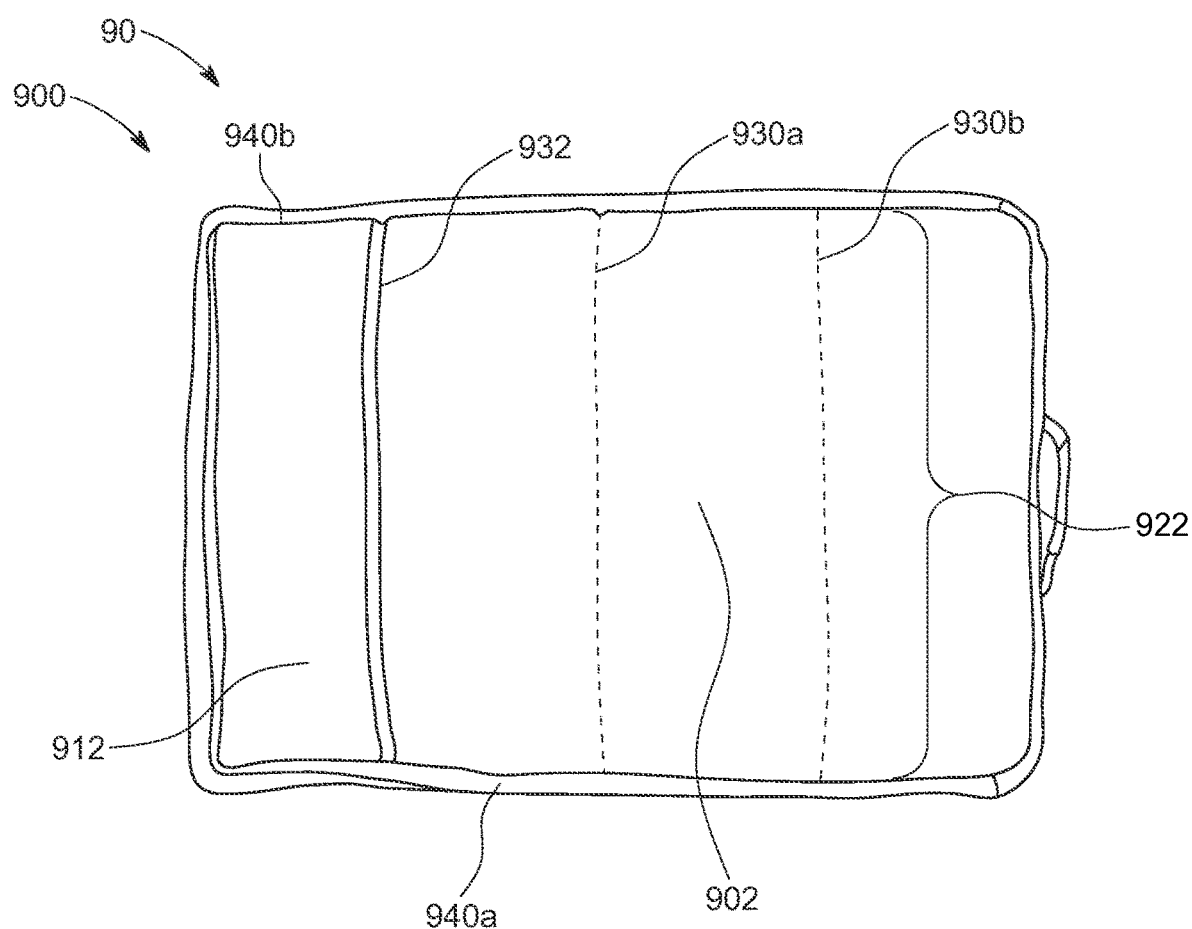
FIG. 7 shows a medial view of an exemplary pet bed, according to an embodiment of the present disclosure, wherein the pet bed is in the sleeping position.
Figure 8:
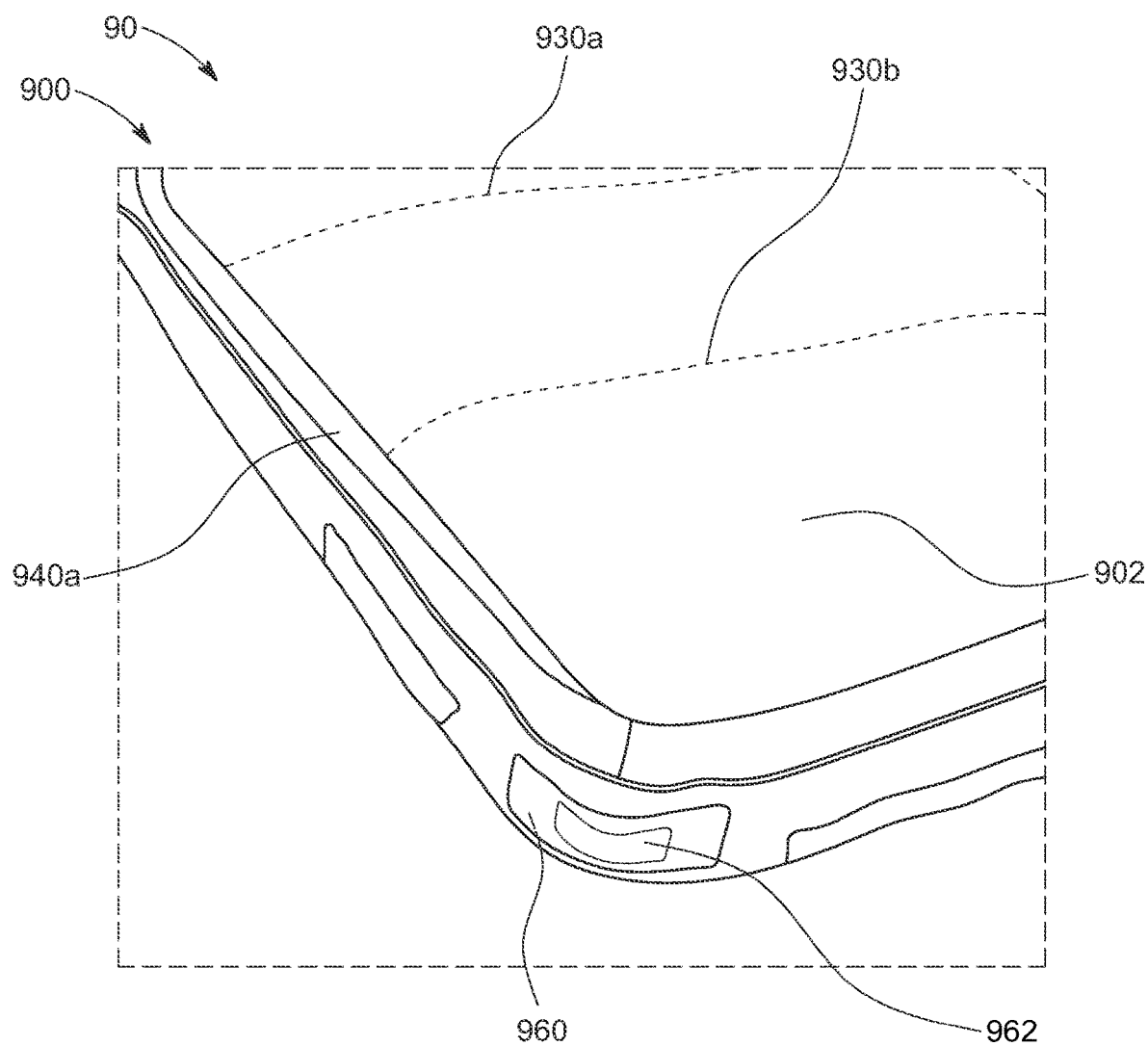
FIG. 8 shows an orthogonal view of an exemplary pet bed, according to an embodiment of the present disclosure.
Figure 9:
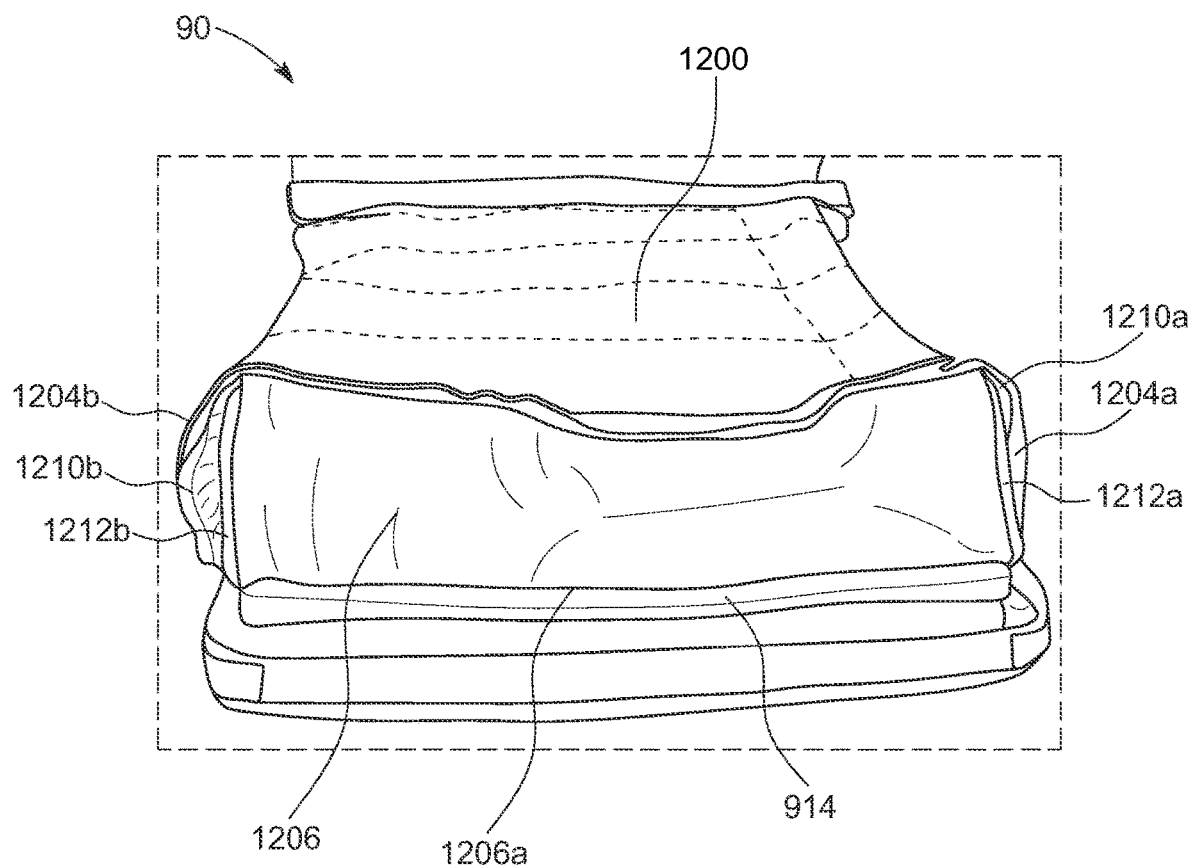
FIGS. 9-10 show exemplary configurations of vent holes formed between the cover and a top surface of the pet bed housing, according to an embodiment of the present disclosure.

FIGS. 8-9 show an exemplary pet bed 90, according to an embodiment of the present disclosure. Pet bed 90 includes many similar features and labels as pet bed 10 of FIGS. 1A-6B. For example, the housing 900 can be described with respect to the housing 100 above, and the cover 1200 can be described with respect to the cover 400 above. Altogether, the pet bed 90 shown in FIG. 7 provides similar advantages to the pet bed 10 of FIGS. 1A-6B. Additional features of the pet bed 90 and the housing 900 are discussed further below.

The housing 900 may comprise a top surface 902. The top surface 902 may comprise the same material as the material described above regarding the top surface 102 of housing 100 of FIG. 1A. In some embodiments, the material of the top surface 902 may further comprise a backing material (not shown) that is configured to thicken the top surface 902 and provide the top surface 902 with greater flexibility and structural integrity. In some embodiments, the backing material may comprise a flexible material such as spandex or nylon. Top surface 902 may also comprise at least one stitching line 930 across the width 922 of the housing 900. The at least one stitching line 930 are advantageous in that they help to secure the material of the top surface 902 to the housing 900, and prevent the material of the top surface 902 from bunching up. In some embodiments, the at least one stitching line 930 comprises a plurality of stitching lines 930a, 930b. In some embodiments, the top surface 902 further comprises a fabric stripe 932 to clearly demarcate the support cushion 912 from the remainder of the top surface 902. In some embodiments, the fabric strip 932 comprises the same material as that described above with regard to the first hood 140 of housing 100.

Figure 10:
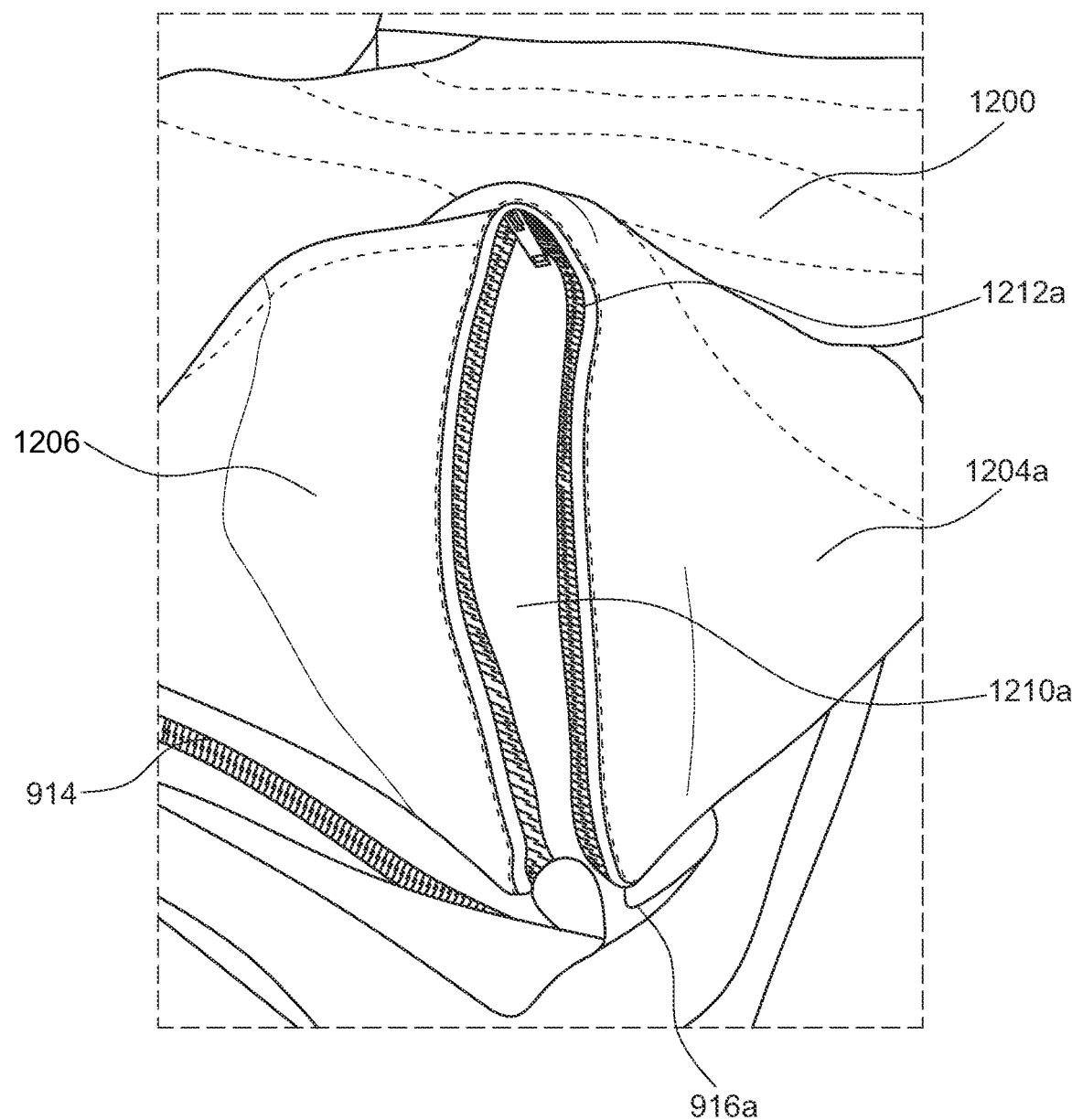

As shown in FIGS. 9-10, pet bed 90 may further comprise a cover 1200 (corresponding to the cover 400 described above), wherein the cover 1200 comprises two winged portions 1204a, 1204b and a flange portion 1206. A first mechanical connector 914 and second mechanical connectors 916a, 916b may be used to detachably secure the two winged portions 1204a, 1204b and the flange portion 1206 of the cover 1200 to at least a portion of the housing 900 when the cover 1200 is in the unrolled configuration. In some embodiments, as shown in FIGS. 7-10, the second mechanical connectors 916a, 916b are covered with hoods 940a, 940b. The hoods 940a, 940b may comprise the same material as the material described above regarding the first hood 140.

When the flange portion 1206 is secured to the housing 900 via the first mechanical connector 914, and the pair of winged portions 1204a, 1204b are secured to the housing 900 via the second mechanical connectors 916a, 916b, vent holes 1210a, 1210b are formed between each of the pair of winged portions 1204a, 1204b and the flange portion 1206. These vent holes 1210a, 1210b allow for air flow between the cover 1200 and the top surface 902 of the housing 900 to provide some temperature control. For instance, the vent holes 1210a, 1210b may allow for cooling air to flow from the outside and into the vent holes 1210a, 1210b, ultimately decreasing the temperature between the cover 1200 and the top surface 902 of the housing 900. In some embodiments, as shown in FIGS. 9-10, the vent holes 1210a, 1210b are adjustable in size to further control the temperature. For instance, vent holes 1210a, 1210b may further comprise vent hole mechanical connectors 1212a, 1212b to open, close, partially open, or partially close the vent holes 1210a, 1210b. In a preferred embodiment, the vent hole mechanical connectors 1212a, 1212b are zippers. In a more preferred embodiment, the vent hole mechanical connectors 1212a, 1212b comprise at least one of hook-and-loop fasteners, male and female connectors, zippers, lip and tape fasteners, double track fasteners, rivets and eyelets, cufflinks, buttons, snaps, clasps, eyelets and laces, one or more adhesives, safety pins, silicone ridges, tie strings, or drawstrings. In a most preferred embodiment, the vent hole mechanical connectors 1212a, 1212b each comprise a zipper and at least one snap, wherein the at least one snap secures the cover 1200 to a vent hood (for instance, 940a,940b), such that air flow between the cover 1200 and the top surface 902 of the housing 900 is further minimized when the vent holes 1210a, 1210b are closed.

The housing 900 may further comprise at least one handle portion 960 (corresponding to the at least one handle portion 700 described above) that may be provided on the housing 900. In some embodiments, the at least one handle portion 700 comprise a reflective strip 962 configured to allow for better visibility of the pet bed 90.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A pet bed, comprising:
a housing comprising a top surface, a bottom surface, and four side surfaces;
a foam layer configured to be located between the top and bottom surfaces of the housing;
an organizer comprising a plurality of compartments for storing pet supplies;
a detachable cover, wherein the detachable cover is detachable from the housing;
at least one fastener for keeping the bed in a first state;
a first pocket which can be opened for accessing the foam layer and the organizer;
a second pocket which can be opened for accessing the detachable cover;
a third pocket which can be opened for accessing the at least one fastener, wherein the at least one fastener is configured to be coupled to the third pocket;
a carry strap, wherein the carry strap comprises a first attachment mechanism at a first distal end and a second attachment mechanism at a second distal end configured to detachably secure the carry strap to the housing;
a first mechanical connector for detachably securing the detachable cover to an inside surface of the second pocket, and a second mechanical connector for detachably securing the detachable cover to at least a portion of the housing when the detachable cover is in the unrolled configuration, wherein
the pet bed is capable of being in the first state and a second state,
the first state is a rolled state in which the housing is rolled,
the second state is an unrolled state in which the housing is unrolled and the top surface of the housing faces upward,
the first pocket for accessing the foam layer and the organizer is accessible by opening the housing along one of the side surfaces of the housing,
the pet bed comprises a sub-pocket disposed inside the first pocket,
the foam layer is configured to be disposed inside the sub-pocket,
the organizer is configured to be disposed outside the sub-pocket and inside the first pocket,
the first distal end of the carry strap comprises a closed loop for accommodating a user's hand or wrist when the carry strap is used as a pet leash,
the closed loop comprises a padded material,
the first attachment mechanism is movable along the closed loop,
the second attachment mechanism comprises a holding portion for attaching the carry strap to a pet's collar, harness, and/or clothing,
the housing comprises a first side, a second side opposite to the first side, a third side disposed between the first side and the second side, and a fourth side disposed between the first side and the second side and opposite to the third side,
the detachable cover comprises:
  a center portion;
  a pair of winged portions extending from latitudinal sides of the center portion; and
  a flange portion extending from one longitudinal side of the center portion;
an outer portion of the flange portion is detachably secured to the inside surface of the second pocket which is disposed at the first side,
an outer edge of one of the winged portions is detachably secured to the third side along the third side, and
an outer edge of another one of the winged portions is detachably secured to the fourth side along the fourth side, wherein
the cover comprises a first layer comprising a first material and a second layer comprising a second material different from the first material,
the pair of winged portions and the flange portion are configured to form vent holes while being secured to the housing, and
the cover comprises vent hole mechanical connectors configured to adjust a size of the vent holes.

2. The pet bed of claim 1, wherein
the detachable cover is rollable to produce a rolled configuration and unrollable to produce an unrolled configuration,
the rolled configuration allows the detachable cover to be received within the second pocket, therein forming a support cushion under the top surface of the housing, and
the unrolled configuration allows the detachable cover to extend over at least a portion of the top surface of the housing.

3. The pet bed of claim 1, wherein
the organizer further comprises an extendable handle strap at a distal end thereof, and
the extendable handle strap is configured to hang the organizer on different-sized objects.

4. The pet bed of claim 1, wherein
the at least one fastener comprises at least one adjustable strap member,
the at least one fastener is configured to keep the bed in the rolled state by at least partially wrapping around the housing in a direction of rolling the housing,
the at least one fastener comprises a first end portion, a second end portion, a middle portion disposed between the first and second end portions,
the first end portion comprises a buckle for keeping the bed in the rolled state, and
the second end portion is coupled to the third pocket.

5. The pet bed of claim 1, further comprising at least one handle portion on at least one of the four side surfaces of the housing or on at least one corner of the housing where one side surface abuts an adjacent side surface.

6. The pet bed of claim 1, wherein
one of the four sides of the housing comprises a fourth pocket, and
a mesh bag is coupled to an inside surface of the fourth pocket.

7. The pet bed of claim 1, wherein the first pocket extends around to at least three of the four surfaces of the housing.

8. The pet bed of claim 7, wherein
the side surfaces of the housing comprise a first side surface, a second side surface, a third side surface, and a fourth side surface,
the first pocket extends around the first, second, and third side surfaces of the housing, and
the housing is capable of being opened up and unfolded along the fourth side surface of the housing.

9. The pet bed of claim 1, wherein the organizer is configured to be opened and closed.

10. The pet bed of claim 1, wherein the organizer comprises a plurality of crease portions and is configured to be folded along the plurality of crease portions.

11. The pet bed of claim 1, wherein
the organizer comprises a plurality of mechanical connectors,
the plurality of compartments of the organizer are configured to be opened and closed by the mechanical connectors of the organizer, and
the plurality of compartments comprises a compartment of a first size and a compartment of a second size different from the first size.

12. A pet bed, comprising:
a housing comprising a top surface, a bottom surface, and four side surfaces which comprise a first side surface, a second side surface opposite to the first side surface, a third side surface, and a fourth side surface opposite to the third side surface;
a plurality of layers located between the top and bottom surfaces of the housing;
a first pocket, which can be opened for accessing the plurality of layers, wherein the plurality of layers comprises
a first foam layer,
a second foam layer, and
an organizer between the first and second foam layers, wherein the organizer can be removed from and reinserted into the first pocket;
a second pocket, which can be opened for accessing a detachable cover comprising a center portion, a pair of winged portions extending from latitudinal sides of the center portion, and a flange portion extending from one longitudinal side of the center portion; and
a carry strap, wherein the carry strap comprises a first attachment mechanism at a first distal end and a second attachment mechanism at a second distal end configured to detachably secure the carry strap to the housing, wherein
an outer edge of the flange portion is detachably secured to the first side surface of the housing, and wherein an outer edge of each of the pair of winged portions is detachably secured to opposing third and fourth side surfaces of the housing, so as to form vent holes between each of the pair of winged portions and the flange portion that allow for air flow between the cover and the top surface of the housing, and wherein the vent holes are adjustable in size to control the temperature between the cover and the top surface of the housing,
the housing is foldable from a sleeping position to a transporting position, wherein in the sleeping position the bottom surface of the housing can rest on the ground and the top surface of the housing is accessible for a pet to rest on, and wherein the transporting position comprises the housing folded upon itself such that primarily the bottom surface is exposed,
the first pocket extends around the first, second, and third side surfaces of the housing,
the housing is capable of being opened up and unfolded along the fourth side surface of the housing,
the first pocket for accessing the first foam layer, the second foam layer, and the organizer is accessible by opening the housing along the fourth side surface of the housing,
the pet bed comprises a sub-pocket disposed inside the first pocket,
the first foam layer is configured to be disposed inside the sub-pocket,
the organizer is configured to be disposed outside the sub-pocket and inside the first pocket,
the first distal end of the carry strap comprises a closed loop for accommodating a user's hand or wrist when the carry strap is used as a pet leash,
the closed loop comprises a padded material,
the first attachment mechanism is movable along the closed loop, and
the second attachment mechanism comprises a holding portion for attaching the carry strap to a pet's collar, harness, and/or clothing.

13. The pet bed of claim 12, further comprising at least one fastener coupled to the second side surface of the housing, wherein
the housing is in a rolled state in the transporting position,
the at least one fastener can be used to secure the housing in the transporting position by at least partially wrapping around the housing in a direction of rolling the housing,
the at least one fastener comprises a first end portion, a second end portion, a middle portion disposed between the first and second end portions,
the first end portion comprises a buckle for keeping the bed in the rolled state, and
the second end portion is coupled to the second side surface of the housing.

14. The pet bed of claim 13, wherein the at least one fastener is coupled to an inside surface of a third pocket on the second side surface of the housing, and wherein the at least one fastener comprises at least one adjustable strap member.

15. The pet bed of claim 12, wherein the organizer is foldable along a plurality of crease portions to produce a stacked configuration and unfoldable to produce an unstacked configuration.

16. The pet bed of claim 12, wherein
the cover is rollable to produce a rolled configuration and unrollable to produce an unrolled configuration,
the rolled configuration allows the cover to be received within the second pocket, therein forming a support cushion under the top surface of the housing, and
the unrolled configuration allows the cover to extend over at least a portion of the top surface of the housing.

17. The pet bed of claim 16, further comprising a first mechanical connector for detachably securing the cover to the inside surface of the second pocket, and a second mechanical connector for detachably securing the cover to at least a portion of the housing when the cover is in the unrolled configuration.

18. The pet bed of claim 12, wherein the cover comprises a first layer comprising a first material and a second layer comprising a second material different from the first material, and the cover comprises vent hole mechanical connectors configured to adjust a size of the vent holes.

* * * * *